United States Patent
Dudda et al.

(10) Patent No.: US 11,889,349 B2
(45) Date of Patent: Jan. 30, 2024

(54) TRANSPORT OF DATA FLOWS OVER CELLULAR NETWORKS

(71) Applicant: Telefonaktiebolaget LM Ericsson (publ), Stockholm (SE)

(72) Inventors: Torsten Dudda, Wassenberg (DE); Hubertus Munz, Aachen (DE); Dhruvin Patel, Aachen (DE); Alexandros Palaios, Moers (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 265 days.

(21) Appl. No.: 17/271,820

(22) PCT Filed: Aug. 16, 2019

(86) PCT No.: PCT/SE2019/050751
§ 371 (c)(1),
(2) Date: Feb. 26, 2021

(87) PCT Pub. No.: WO2020/050758
PCT Pub. Date: Mar. 12, 2020

(65) Prior Publication Data
US 2021/0321292 A1    Oct. 14, 2021

Related U.S. Application Data

(60) Provisional application No. 62/726,364, filed on Sep. 3, 2018.

(51) Int. Cl.
*H04W 4/00* (2018.01)
*H04W 28/06* (2009.01)
(Continued)

(52) U.S. Cl.
CPC ............ *H04W 28/06* (2013.01); *H04L 69/04* (2013.01); *H04L 69/22* (2013.01); *H04W 28/0268* (2013.01)

(58) Field of Classification Search
None
See application file for complete search history.

(56) References Cited

U.S. PATENT DOCUMENTS

2007/0242697 A1* 10/2007 Caulfield .................. H04L 1/18
370/522
2010/0003928 A1    1/2010 Tang et al.
(Continued)

OTHER PUBLICATIONS

3GPP, "3GPP TS 29.561 V15.0.0", 3rd Generation Partnership Project; Technical Specification Group Core Network and Terminals; 5G System; Interworking between 5G Network and external Data Networks; Stage 3 (Release 15), Jun. 2018, 1-44.
3GPP, "3GPP TS 38.300 V1.3.0", 3rd Generation Partnership Project; Technical Specification Group Radio Access Network; NR; NR and NG-RAN Overall Description; Stage 2 (Release 15), Dec. 2017, 1-68.
(Continued)

*Primary Examiner* — Zewdu A Beyen
(74) *Attorney, Agent, or Firm* — Murphy, Bilak & Homiller, PLLC

(57) ABSTRACT

Embodiments of the disclosure provide methods, apparatus and machine-readable media relating to transport of data flows over cellular network. One method in a core network node comprises: obtaining configuration information for a data stream in an external data network, the configuration information indicating respective values for one or more fields within a header of data packets associated with the data stream which are to remain static; initiating transmission of the configuration information to a wireless device which is to receive the data stream; receiving a data packet associated with the data stream from the external data network; removing the one or more fields from the data packet to generate a compressed data packet; and initiating transmission of the compressed data packet to the wireless device.

37 Claims, 22 Drawing Sheets

UPF: User Plane Function
NRF: Network Repository Function
AMF: Access Management Function
SMF: Session Management Function
NEF: Network Exposure Function
PCF: Policy Control Function
UDM: Unified Data Management

(51) Int. Cl.
　　　*H04L 69/04*　　　(2022.01)
　　　*H04L 69/22*　　　(2022.01)
　　　*H04W 28/02*　　　(2009.01)

(56) References Cited

U.S. PATENT DOCUMENTS

| | | |
|---|---|---|
| 2011/0058530 A1 | 3/2011 | Kim et al. |
| 2013/0322346 A1 | 12/2013 | Comeau et al. |
| 2014/0369365 A1 | 12/2014 | Denio et al. |
| 2016/0135095 A1 | 5/2016 | Wu |
| 2017/0033911 A1 | 2/2017 | Bressanelli et al. |
| 2017/0289046 A1 | 10/2017 | Faccin et al. |
| 2018/0034726 A1 | 2/2018 | Kim et al. |
| 2018/0206151 A1 | 7/2018 | Bressanelli et al. |

OTHER PUBLICATIONS

3GPP, "3rd Generation Partnership Project; Technical Specification Group Services and System Aspects; Procedures for the 5G System; Stage 2 (Release 15)", 3GPP TS 23.502 V15.2.0, Jun. 2018, 1-308.
3GPP, "3rd Generation Partnership Project; Technical Specification Group Services and System Aspects; System Architecture for the 5G System; Stage 2 (Release 15)", 3GPP TS 23.501 V15.2.0, Jun. 2018, 1-217.
Sandlund, K., et al., "The RObust Header Compression (ROHC) Framework", Internet Engineering Task Force (IETF), Request for Comments: 5795, Obsoletes: 4995, Category: Standards Track, ISSN: 2070-1721, Mar. 2010, 1-41.

\* cited by examiner

TRANSPORT OF DATA FLOWS OVER CELLULAR NETWORKS

TECHNICAL FIELD

Embodiments of the present disclosure relate to the transport of data flows over a communication network, and particularly provide methods and apparatus for transmitting and receiving compressed data packets associated with a data stream in an external data network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates the architecture of a 5G network and introduces all relevant core network functions like the User Plane Function (UPF).

In NR PDCP, header compression is used and the protocol is based on the Robust Header Compression (ROHC) framework defined in IETF RFC 5795: "The Robust Header Compression (RoHC) Framework". The basic idea is to utilize the redundancy in protocol headers of new packets, i.e. use the fact that they are similar or the same as previously received packets. Therefore, subsequent packets do not need to include the full protocol header information since it is already known from previously received packets. A compression/decompression context is maintained to keep track of that information. Several different RoHC profiles with different header compression algorithms/variants exist and are defined/referred to in the NR PDCP specification.

US 2013/0322346 discloses a system in which a Transport and Control entity (which uses RoHC for communications with UEs) can be integrated into MME and SGW nodes.

The UE undergoes a handover procedure when it changes its primary cell. The source and target cell may belong to different gNBs. Focusing on the user plane protocol stack involved in this procedure: the UE resets MAC with HARQ processes, and re-establishes (flushes) the RLC entities. The PDCP protocol serves as the handover anchor, meaning that PDCP will in acknowledged mode do retransmissions of not yet acknowledged data, that might have been lost due to MAC/HARQ and RLC flushing at handover.

In dual connectivity, beside handover, a radio bearer might be changed from MCG type to/from SCG type or to/from Split type. This can be realized with the handover procedure including PDCP re-establishment, or alternatively with the PDCP data recovery procedure.

Support for Ethernet PDU sessions over 5G networks was introduced in 3GPP TS 23.501 and TS 23.502 (see, for example, versions 15.2.0 of both those specifications).

FIG. 2 shows the protocol stack for Ethernet PDU type data (user plane) as defined in release 15 of 3GPP TS 29.561, "Interworking between 5G Network and External Data Networks; Stage 3". External data networks may include, for example, Ethernet LANs. Key characteristics for such interworking with external Data Networks (DNs) include:

UPF shall store MAC addresses received from the DN or the UE; the 5G network does not assign MAC addresses to UEs Ethernet preamble, Start Frame Delimiter (SFD) and Frame Check Sequence (FCS) are not sent over 5GS The SMF provides Ethernet filter set and forwarding rules to the UPF based on the Ethernet Frame Structure and UE MAC addresses During PDU session establishment a DN-AAA (Data Network-Authentication, Authorization and Accounting) server can provide a list of MAC addresses allowed for this particular PDU session (see release 15 of 3GPP TS 29.561).

IP layer is considered as an application layer which is not part of the Ethernet PDU Session (see release 15 of 3GPP TS 29.561)

Time Sensitive Networking (TSN) is a set of features that allow deterministic networking in Ethernet based wired communication networks. Within a TSN network the communication endpoints are called Talker and Listener. All the switches (e.g., bridges) in between Talker and Listener need to support certain TSN features, like e.g. IEEE 802.1AS time synchronization. All nodes that are synchronized in the network belong to a so-called TSN domain. TSN communication is only possible within such a TSN domain. To allow for deterministic communication, TSN communication happens in streams, that are setup across the TSN domain before the data communication takes place. In the TSN network, there are different possibilities as to how frames are identified and mapped to a TSN stream, as defined in IEEE 802.1CB. The identification might be based on MAC addresses and VLAN-headers and/or IP headers. But as the TSN standard is under development now, other aspects (e.g. the Ether-Type field) might also be introduced therein to identify frames. After a TSN stream has been established in the TSN network, frames are identified in the whole TSN network based on the specific stream identifiers.

There currently exist certain challenge(s).

There is currently no header compression defined for Ethernet frames for a 5G network. This would lead to transmission of uncompressed Ethernet frames, which entails a significant overhead given the typically small payload sizes for certain types of traffic, such as industrial IoT/URLLC traffic.

During handover re-establishment and data recovery, RoHC performance cannot be guaranteed, which is problematic for services relying on guaranteed transmission success. Counteracting this issue by provisioning more resources for the service (e.g. not using RoHC) is likely to lead to unacceptable resource wastage.

A protocol for Ethernet header compression aligned with RoHC may sometimes be able to lead to good compression ratios but not deterministically, e.g. in the above handover situation. This leads to the disadvantage of radio access nodes (e.g., gNB) also being unable to reserve minimum-needed resources deterministically, i.e. such nodes may need to reserve more resources for the case that header compression does not lead to full compression, coming with additional resource wastage.

A RoHC compression context loss (e.g. due to a handover) will lead to delays in packet forwarding at the receiver which may be unacceptable for URLLC traffic.

SUMMARY

Certain aspects of the present disclosure and their embodiments may provide solutions to these or other challenges.

The present disclosure is described within the context of 3GPP NR radio technology (e.g., 3GPP TS 38.300 V1.3.0). However, it will be understood by those skilled in the art that embodiments of the disclosure also apply to other cellular communication networks. Embodiments of the disclosure enable the efficient transport of data flows (e.g., time-sensitive data flows, such as those for time-sensitive networking (TSN)) over a cellular (e.g., 5G) network by compressing redundant information. This is achieved by making one or more core network nodes TSN-aware, supporting the handling of the TSN flows while reducing unnecessary overhead.

In a first aspect, there is provided a method performed by a core network node for a wireless communications network for transport of data packets associated with a data stream in an external data network. The method comprises: obtaining configuration information for a data stream in an external data network, the configuration information indicating respective values for one or more fields within a header of data packets associated with the data stream which are to remain static; initiating transmission of the configuration information to a wireless device which is to receive the data stream; receiving a data packet associated with the data stream from the external data network; removing the one or more fields from the data packet to generate a compressed data packet; and initiating transmission of the compressed data packet to the wireless device.

In a second aspect, there is provided a method performed by a core network node for a wireless communications network for transport of data packets associated with a data stream in an external data network. The method comprises: obtain configuration information for a data stream in an external data network, the configuration information indicating respective values for one or more fields within a header of data packets associated with the data stream which are to remain static; receiving a data packet associated with the data stream from a wireless device; adding the one or more fields to the data packet to generate a decompressed data packet; and initiating transmission of the decompressed data packet over the external data network.

A third aspect provides a method performed by a wireless device associated with a wireless communications network, for transport of data packets associated with a data stream in an external data network. The method comprises: obtaining configuration information for a data stream in an external data network, the configuration information indicating respective values for one or more fields within a header of data packets associated with the data stream which are to remain static; receiving, from a radio access network node of the wireless communications network, a data packet associated with the data stream; and adding the one or more fields to the data packet to generate a decompressed data packet.

A fourth aspect provides a method performed by a wireless device for transport of data packets associated with a data stream in an external data network. The method comprises: obtaining configuration information for a data stream in an external data network, the configuration information indicating respective values for one or more fields within a header of data packets associated with the data stream which are to remain static; obtaining a data packet associated with the data stream; removing the one or more fields from the data packet to generate a compressed data packet; and initiating transmission of the compressed data packet over the external data network via a transmission to a radio access network node of a wireless communications network.

Apparatus for performing the methods outlined above is also provided.

Methods are outlined in this disclosure for header compression of Ethernet/TSN stream-based transmissions in a 5G network. Compared to known methods like RoHC for IP header compression, the methods outlined herein rely on specific properties of the Ethernet/TSN stream to enable a deterministic compression ratio.

There are, proposed herein, various embodiments which address one or more of the issues disclosed herein.

Certain embodiments may provide one or more of the following technical advantage(s). Ethernet header compression in cellular networks generally lowers resource usage, increasing capacity. Embodiments of the disclosure may lead to a deterministic compression ratio, i.e. enabling deterministic minimum-needed resource reservations for the flow/UE instead of needing to account for situations where this optimum compression ratio cannot be met. In this way, the capacity of the system is improved. In particular, Deterministic compression is useful since the data to be transmitted over the radio remains constant and does not fluctuate between packets. In this way, the scheduling of DL or UL transmissions becomes less dynamic. For example, the scheduling may be based on semi-persistent scheduling (SPS) or configured UL grants, i.e. those grants need to be provided only once; error-prone and frequent dynamic scheduling to adjust DL/UL transmission sizes is thus not needed.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As described below, embodiments of the disclosure assume that values for one or more fields in a data packet header (e.g., an Ethernet header) are static for an established data stream such as a TSN stream. In this context, a value may be considered "static" if it remains the same for multiple data packets in sequence within the data stream. Thus, this does not preclude embodiments in which the values for the fields in the header are updated as necessary (i.e. semi-static). The values for the fields may or may not remain the same for the lifetime of the data stream.

Static Fields in TSN Headers and Static Configuration

TSN streams are established and a configuration is applied across all nodes involved in the TSN stream before any data packet is transmitted. This includes also, that TSN stream identifiers are announced.

Figure 3:
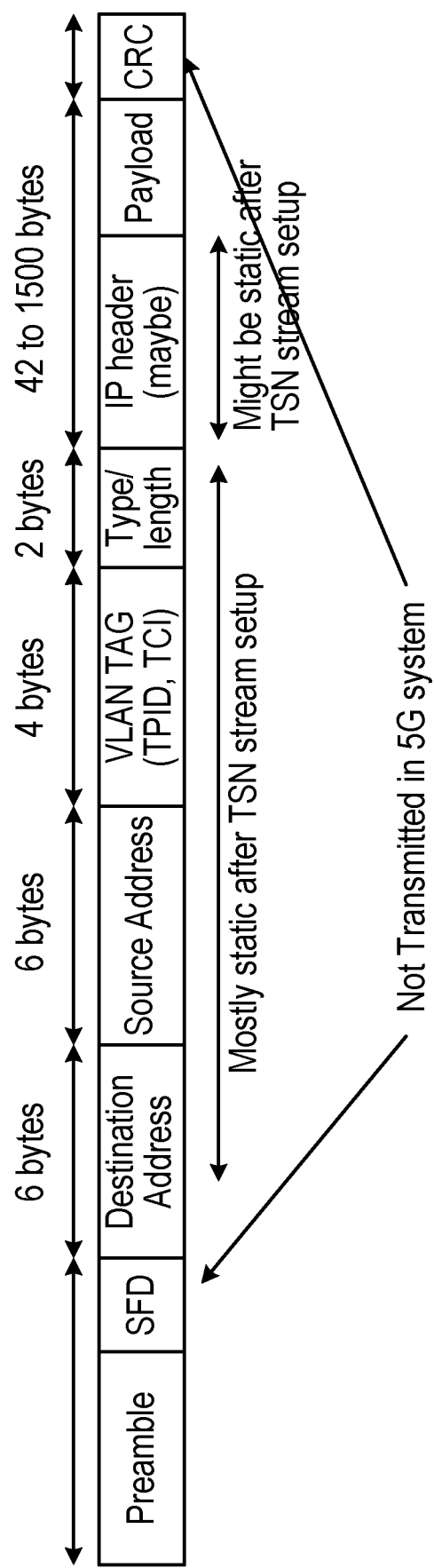
FIG. 3 shows a TSN frame structure.

FIG. 3 shows a frame structure for a TSN data packet.

Within a TSN stream, header fields are used to identify a stream. These fields comprise of e.g. DST MAC address (6 byte), VLAN-header (4 bytes) and IP-Header fields (various fields). These fields are not usually altered after a TSN stream has been setup. Therefore, these fields offer the possibility of a static compression throughout the 5G network, e.g. UPF to UE, gNB to UE, etc.

According to one embodiment of the disclosure, one or more fields within a header for the data packet are configured for the UE and/or the gNB or UPF before data transmission takes place. For example, the one or more fields may comprise the Ethernet header and maybe also other header fields as for example parts of an IP-header in case they are used for TSN stream identification.

The values for the fields in the header for packets received or transmitted in a QoS flow may be configured per QoS flow. Additionally or alternatively, the values for the fields in the header for packets received or transmitted in a PDU session may be configured per PDU session.

Figure 4:
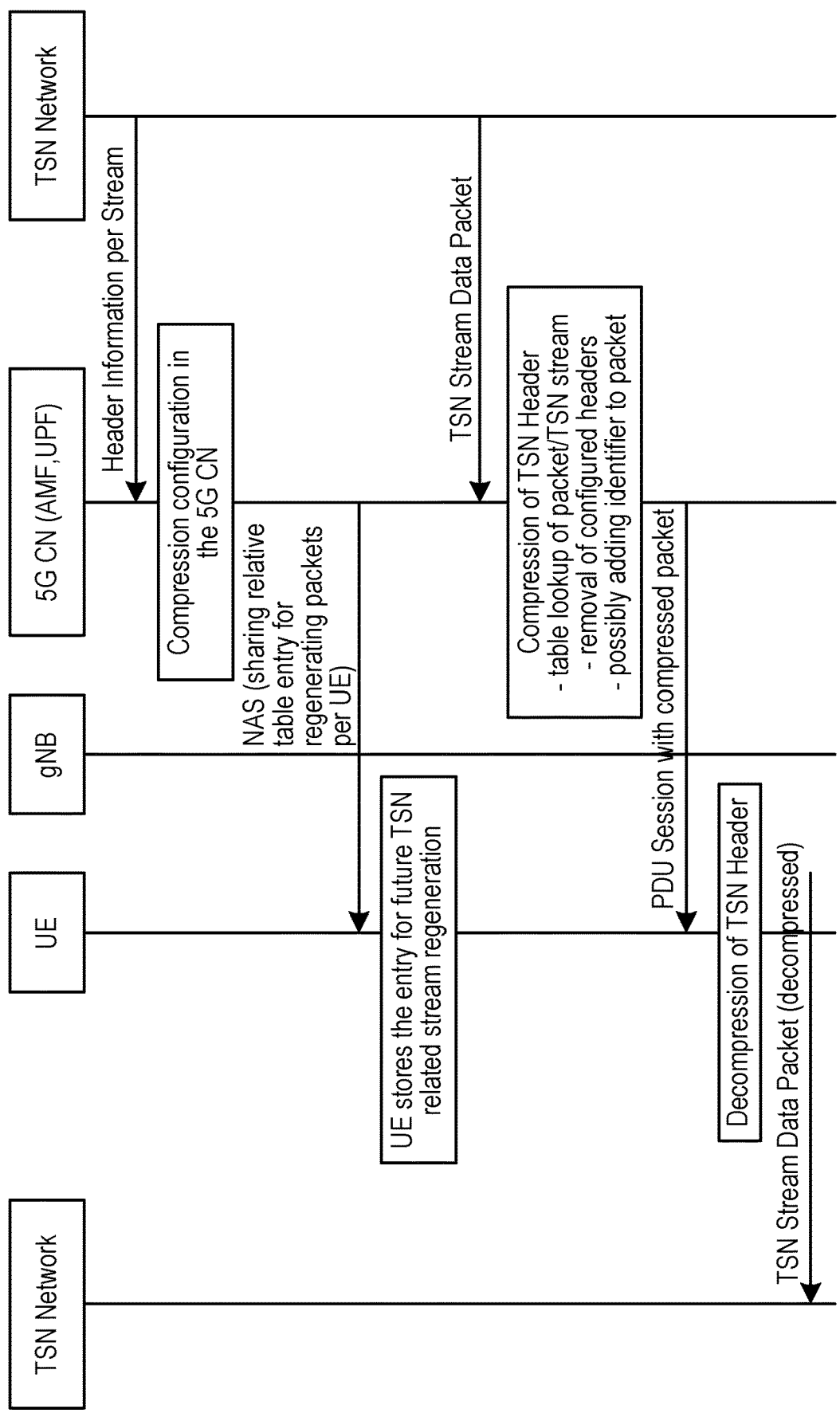
FIG. 4 shows a signaling diagram for downlink signaling according to embodiments of the disclosure.

The procedure for downlink is illustrated in FIG. 4.

For TSN streams in the Downlink the 5G CN (e.g., a core network node, such as the AMF or UPF, or a combination of both) may use information from a TSN network regarding TSN stream identification and which fields can be treated as static or not, or it might use a pre-configuration for this.

An identifier might be added to data packets inside of PDU sessions or QoS Flows to differentiate multiple TSN/Ethernet streams within the same session or flow (thus the identifier is for a particular TSN/Ethernet stream). For example, the identifier may be used instead of the Ethernet header fields removed statically for transmission; an 8-bit header might be sufficient to separate TSN streams inside sessions or flows.

For header compression between UPF and UE (initiated by 5G CN), NAS signaling is used. This comprises to signal the header content that is statically mapped to the UE and optionally also a stream identifier that is used within a PDU session or within a QoS Flow to differentiate between different TSN streams. The 5G CN configures the UPF for the static mapping.

For Downlink transmissions for header compression between gNB and UE, RRC signaling can be used, i.e. when a new QoS flow is established for the UE, the UE is instructed to utilize the configured header for packets received on this QoS flow. In an alternative embodiment, PDCP control signaling is employed to indicate updates to the otherwise static header context (i.e. providing the UE with a new header context), allowing a semi-static header configuration for the UE.

Furthermore, in all cases above, when an update of the static header is indicated, or the new static header is indicated, a sequence number may be indicated alongside, identifying the packet from which onwards the new header should be used for decompression.

In a further embodiment, in the receiving entity (e.g., UE in DL), reordering of received packets according to a sequence number should be applied prior to header decompression. This way, when indicating new configured headers alongside with a sequence number, the first packet for which a new configured header is valid is identified.

Figure 5:
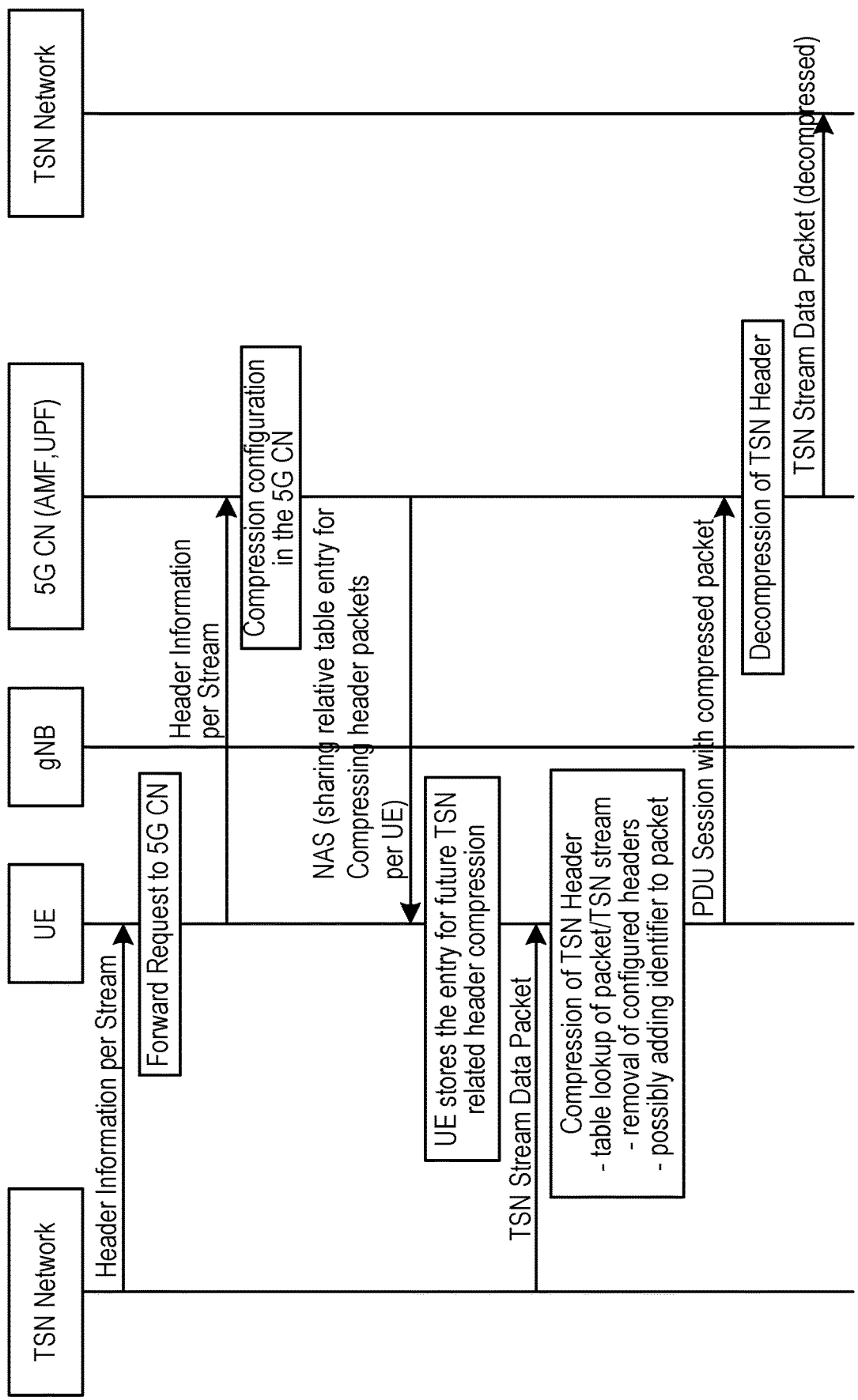
FIG. 5 shows a signaling diagram for uplink signaling according to embodiments of the disclosure.

The procedure for uplink is illustrated in FIG. 5.

For TSN streams in the Uplink the UE might get information from a TSN network regarding TSN stream identification and which fields can be treated as static or not and inform the 5G CN accordingly (e.g., by forwarding the request from the TSN network to the 5G CN).

An identifier might be added to data packets inside of PDU sessions or QoS Flows to differentiate multiple TSN/Ethernet streams within the same session or flow (thus the identifier is for a particular TSN/Ethernet stream). For example, the identifier may be used instead of the Ethernet header fields removed statically for transmission; an 8-bit header might be sufficient to separate TSN streams inside sessions or flows.

For header compression between UE and UPF (initiated by UE), again NAS signaling is used. The UE might request a static header compression from the 5GCN by signaling the request over NAS alongside any TSN configuration data it has received from a TSN network regarding the TSN stream packet headers. The 5GCN may then configure the static mapping in the UPF and possibly also assign a stream identifier that is used within a PDU session or within a QoS Flow to differentiate between multiple TSN streams. The 5GCN may use NAS signaling to inform the UE about the static mapping, as well as a potential identifier to use. The 5GCN configures the UPF for the static mapping.

Furthermore, in all cases above, when an update of the static header is indicated, or the new static header is indicated, a sequence number may be indicated alongside, identifying the packet from which onwards the new header should be used for decompression.

For Uplink transmissions, the UE is configured to remove the Ethernet header fields before transmission. The configuration may be indicated via RRC signaling or NAS signaling. The header removal function may be implemented in an SDAP or PDCP transmission algorithm. A sequence number may be indicated identifying the first packet from which onwards the removal of Ethernet header fields applies.

For Uplink transmissions, the UE indicates the (removed) header to the 5G network prior to any data transmission, so that the 5G network can consider the header when receiving packets from the UE. Also, in this case the header can be configured per QoS flow or per PDU session. Furthermore, a sequence number may be indicated identifying the first packet for which the header had been removed and the configured header should be applied to.

In a further embodiment, in the receiving entity (gNB or UPF in UL), reordering of received packets according to a sequence number should be applied prior to header decompression. This way, when indicating new configured headers alongside with a sequence number, the first packet for which a new configured header is valid for is identified.

To handle TSN streams over radio, radio resources may be pre-allocated using e.g. semi-persistent scheduling (SPS) or instant-uplink access (IUA). Resource pre-allocation benefits from a known payload size for transmission. In the RoHC framework the worst-case payload size is still the whole packet including all headers; as it cannot be determined when it is necessary to transmit the full context, it would be necessary to reserve resources for the worst-case. This is not the case for the static header compression method outlined above.

TSN is based on timely delivery of packets. Packets that have to be retransmitted or buffered because of a context unawareness lead to packet latencies that are most likely unacceptable. It would be better to either discard the packet or reuse an old (or as introduced in this disclosure, statically configured) context instead.

Figure 6:
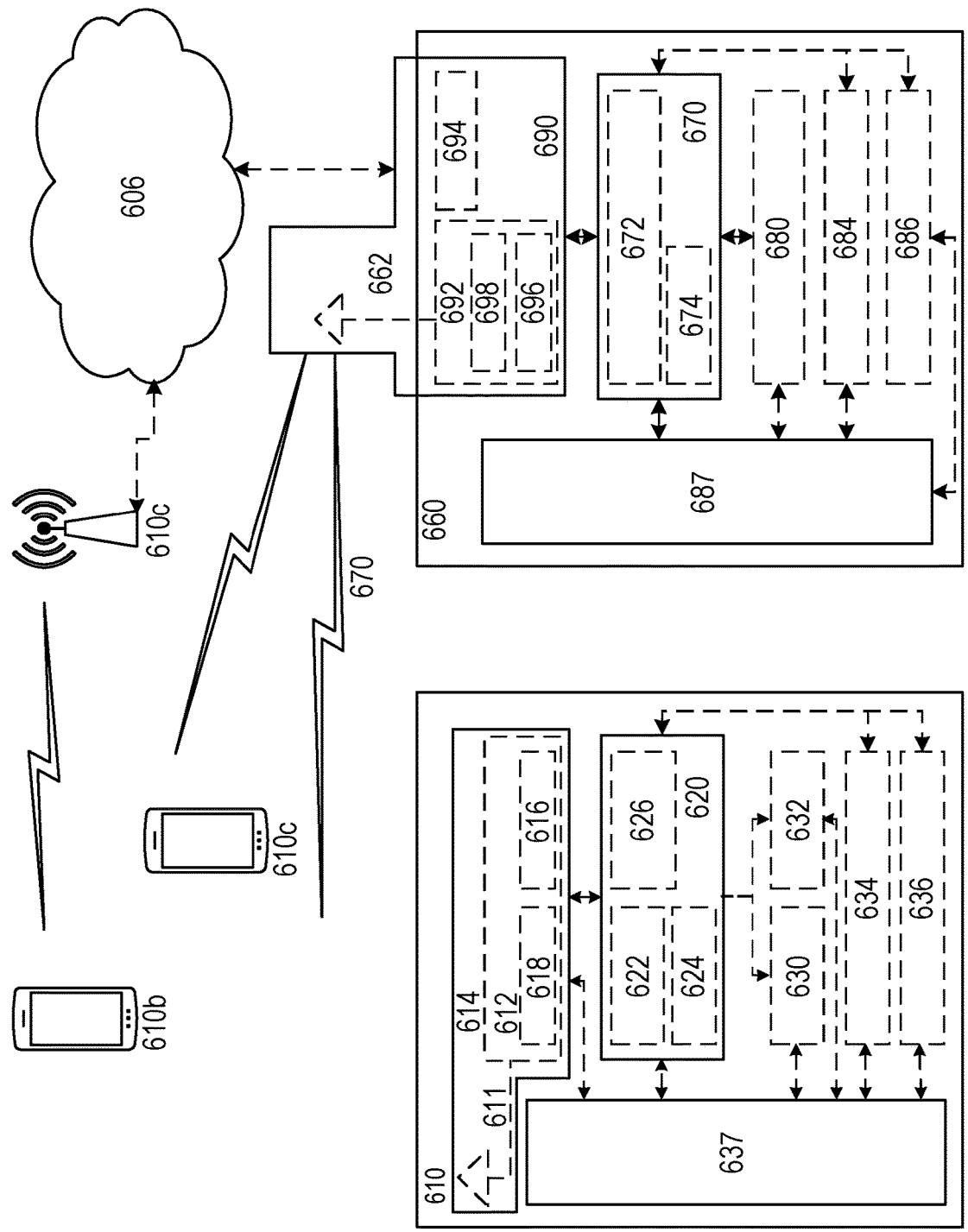
FIG. 6 shows a wireless network according to embodiments of the disclosure.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660*b*, and WDs 610, 610*b*, and 610*c*. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Figure 1:
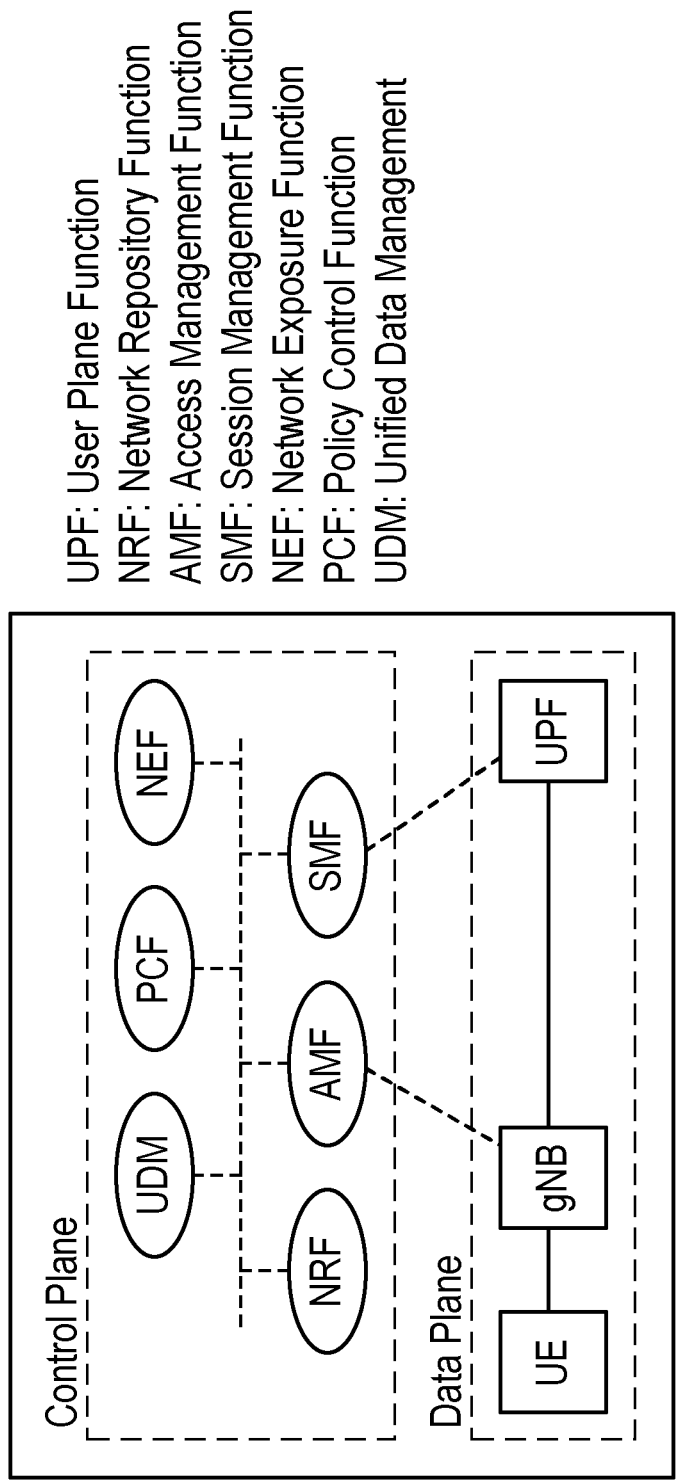
FIG. 1 shows 5G Core Network (5GCN) Functions and Radio Access Network (RAN)
Figure 2:
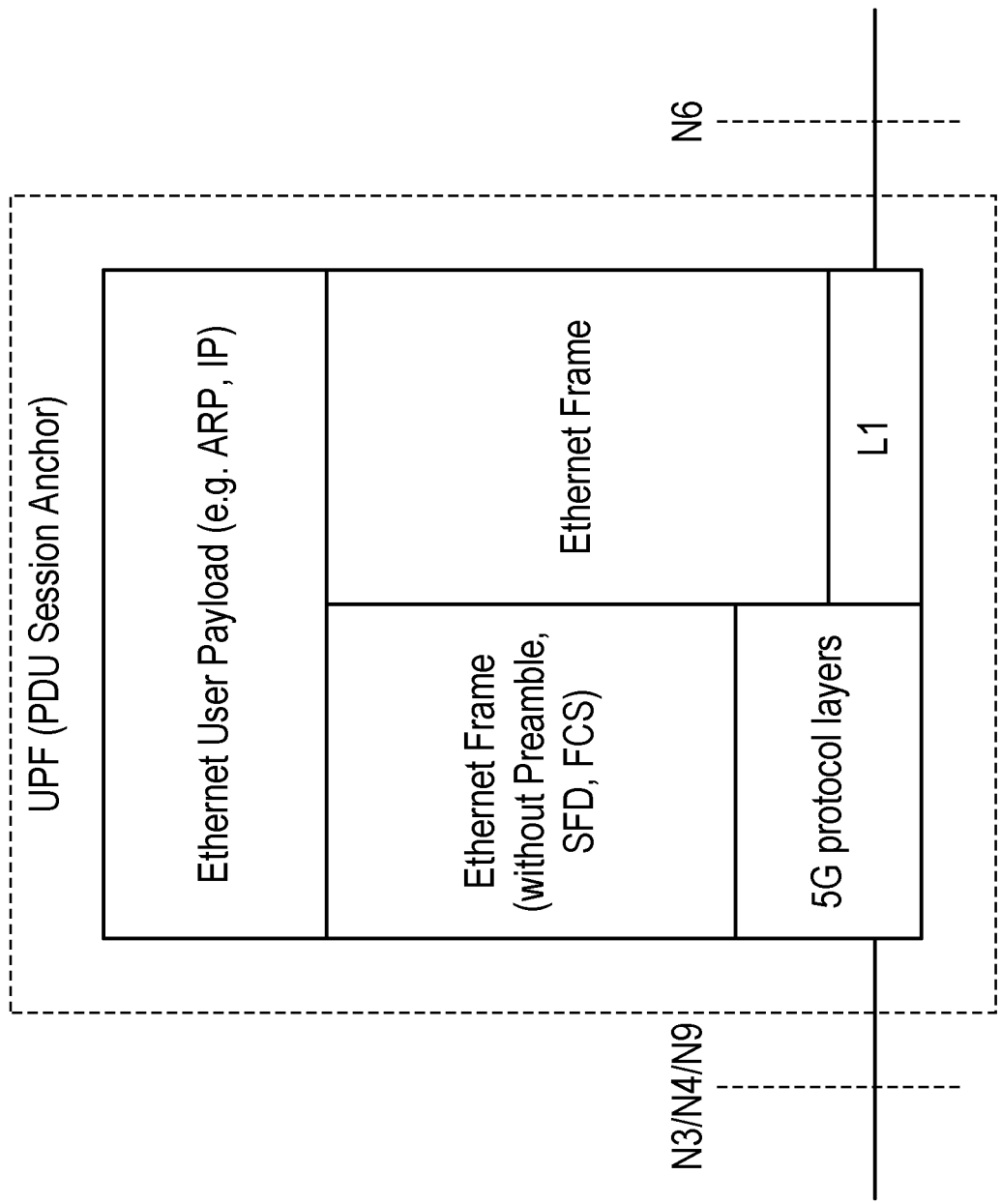
FIG. 2 shows protocol stacks for Ethernet PDU type data.

In particular, according to embodiments of the disclosure the network 606 comprises a core network. The core network comprises one or more core network nodes or functions, such as an access management function and a user plane function. Further information regarding the structure of the core network can be found above in FIG. 1.

The core network nodes may comprise processing circuitry and a power source, configured to provide power to the core network nodes. The core network nodes may be configured to perform any of the methods described herein, such as the methods shown below in FIGS. 15 and 17, and the signalling above for the element "SGCN" in FIGS. 4 and 5. The processing circuitry may be configured to perform those methods, for example, through executing instructions stored in a non-transitory computer-readable medium.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
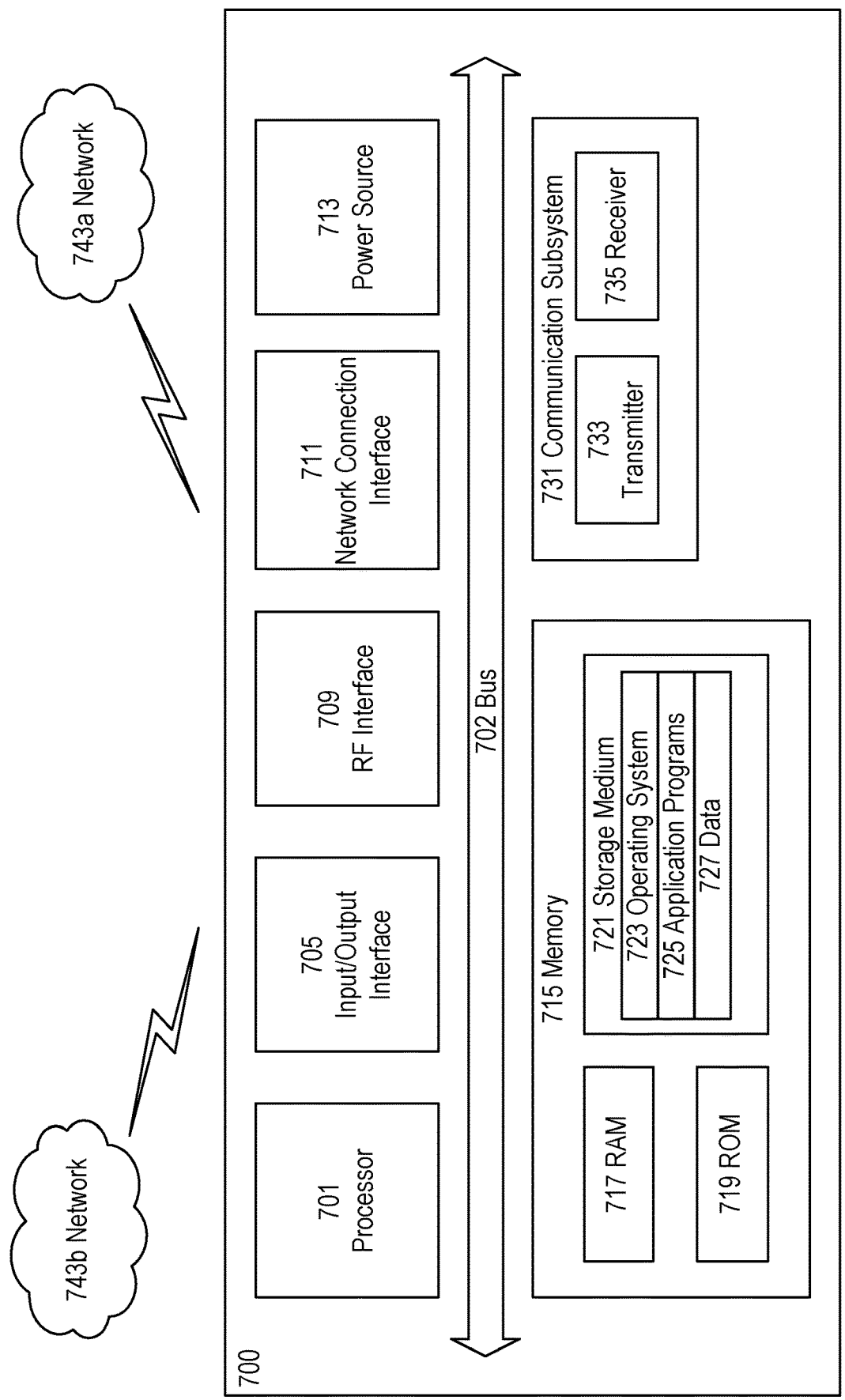
FIG. 7 shows a user equipment according to embodiments of the disclosure.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743*a*. Network 743*a* may encompass wired and/or wireless networks such as a local-area network (LAN), a wide-area network (WAN), a computer network, a wireless network, a telecommunications network, another like network or any combination thereof. For example, network 743*a* may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
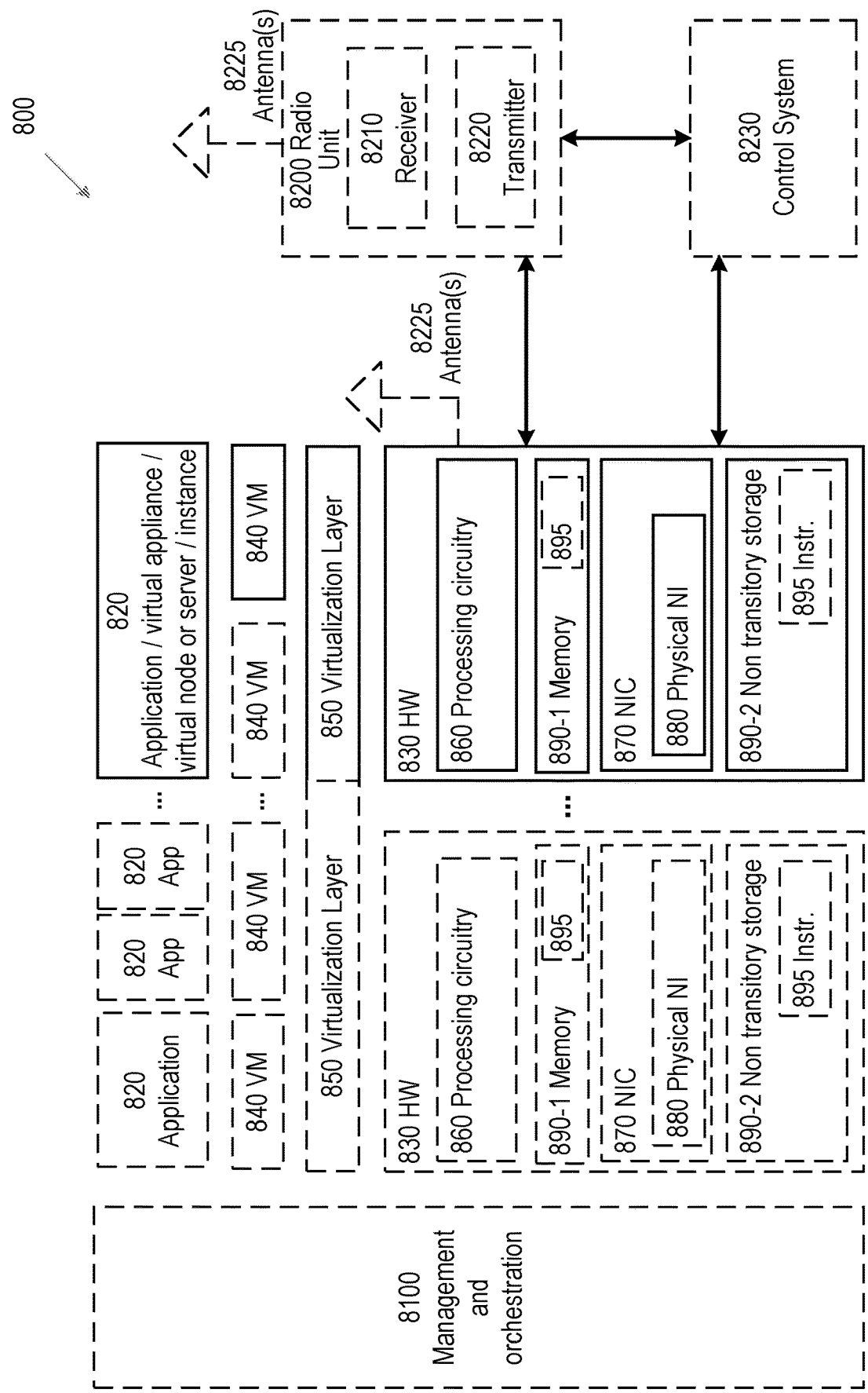
FIG. 8 shows a virtualization environment according to embodiments of the disclosure.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
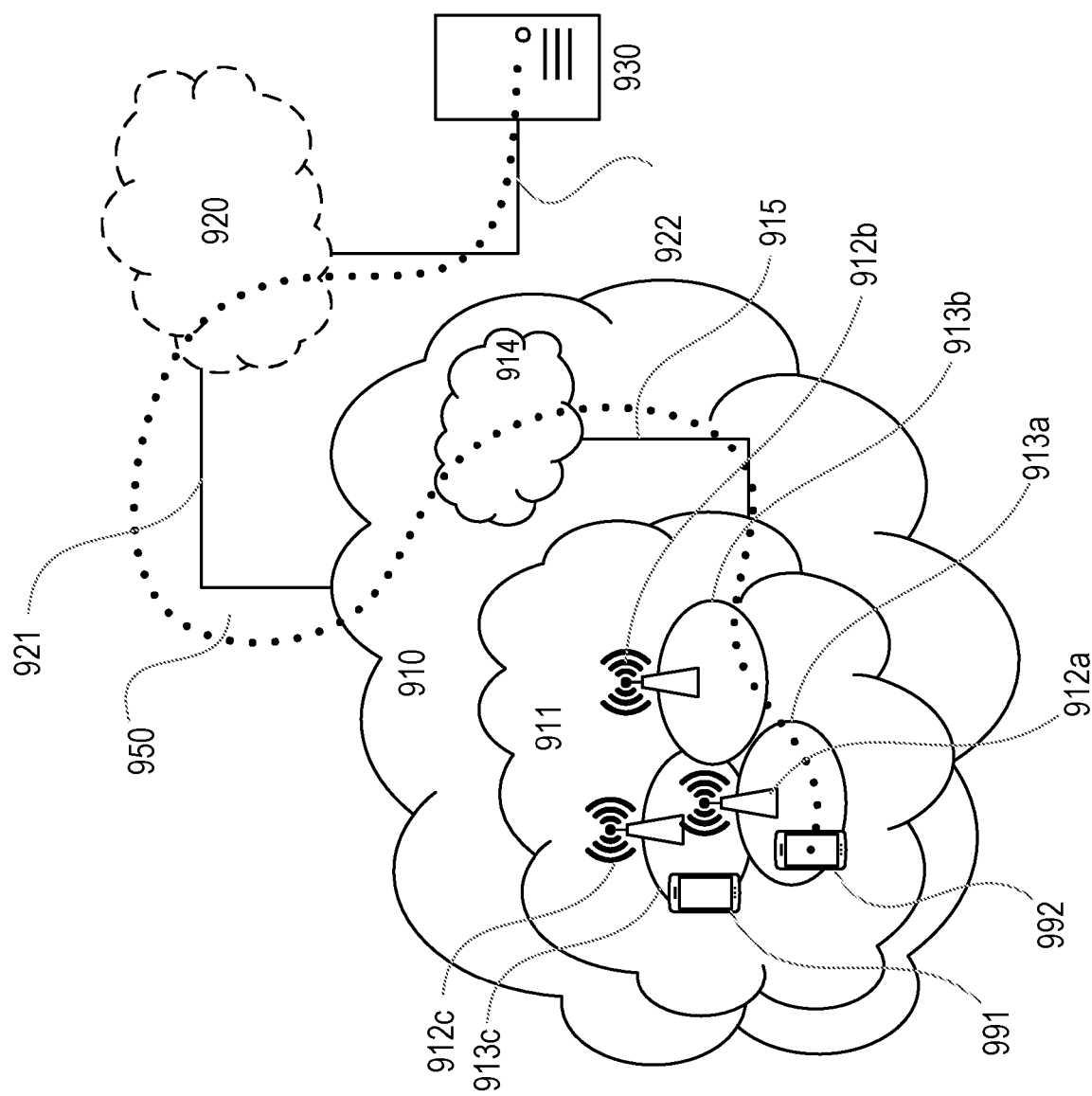
FIG. 9 shows a telecommunication network connective via an intermediate network to a host computer according to embodiments of the disclosure.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
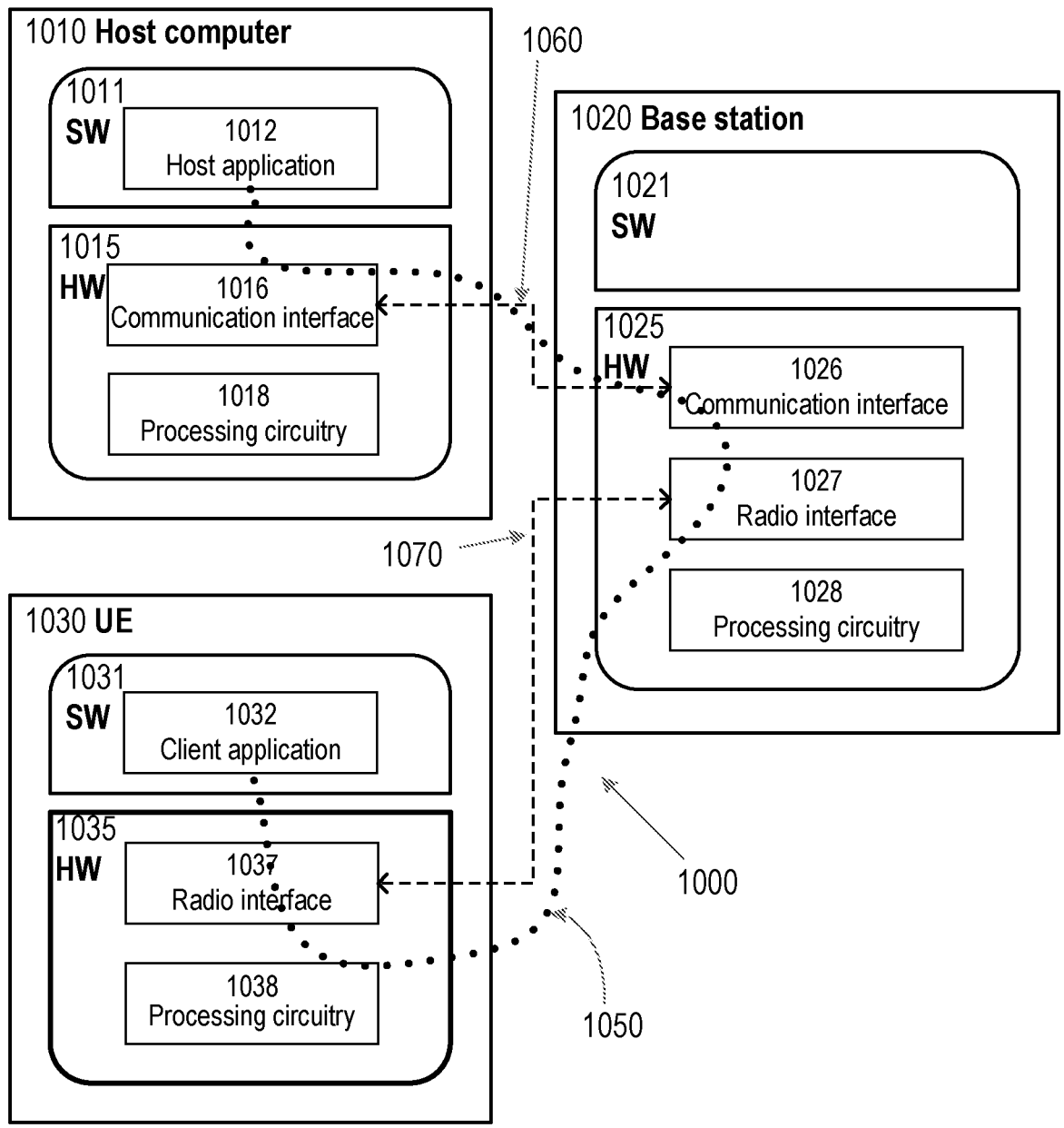
FIG. 10 shows a host computer communicating via a base station with a user equipment over a partially wireless connection according to embodiments of the disclosure.

It is noted that host computer 1010, base station 1020 and UE 1030 illustrated in FIG. 10 may be similar or identical to host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
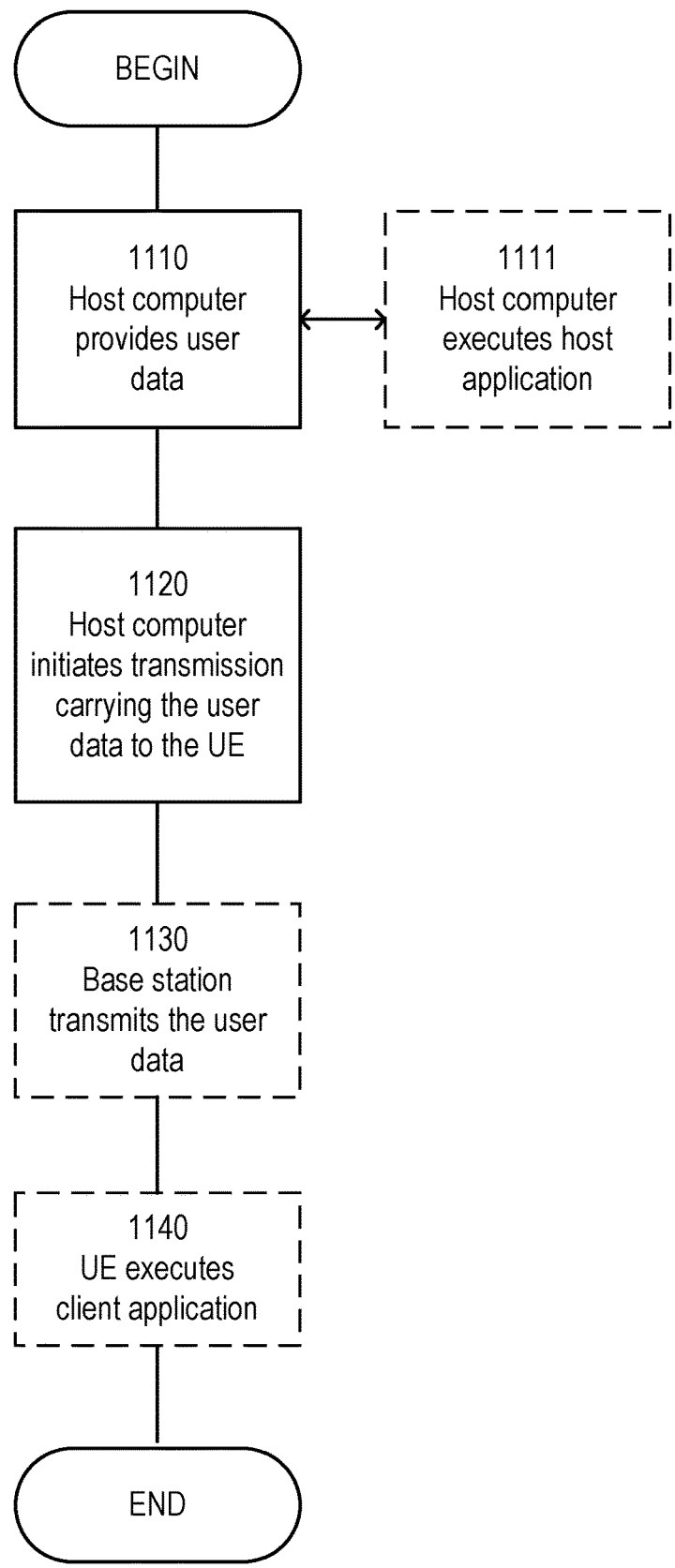
FIGS. 11 to 14 are flowcharts of methods implemented in a communication system including a host computer, a base station, a core network node and a user equipment according to embodiments of the disclosure.

FIG. 11 is a flowchart illustrating a method implemented in a communication system, in accordance with one embodiment. The communication system includes a host computer, a core network node, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. For example, the host computer may initiate a transmission carrying the user data by transmitting the data to the core network node, which subsequently transmits the data to the base station. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
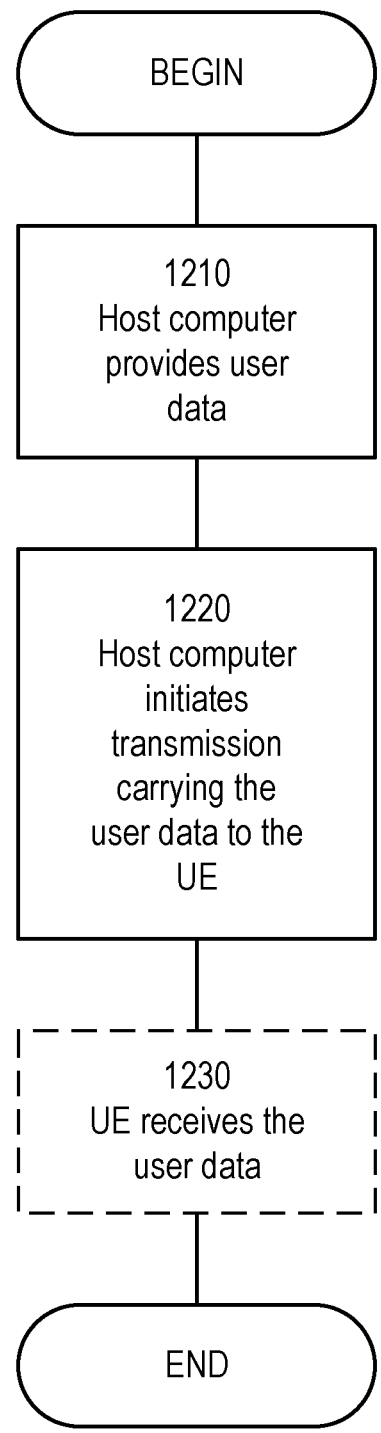

FIG. 12 is a flowchart illustrating a method implemented in a communication system, in accordance with one embodiment. The communication system includes a host computer, a base station, a core network node and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the core network node and the base station, in accordance with the teachings of the embodiments described throughout this disclosure. In step 1230 (which may be optional), the UE receives the user data carried in the transmission.

Figure 13:
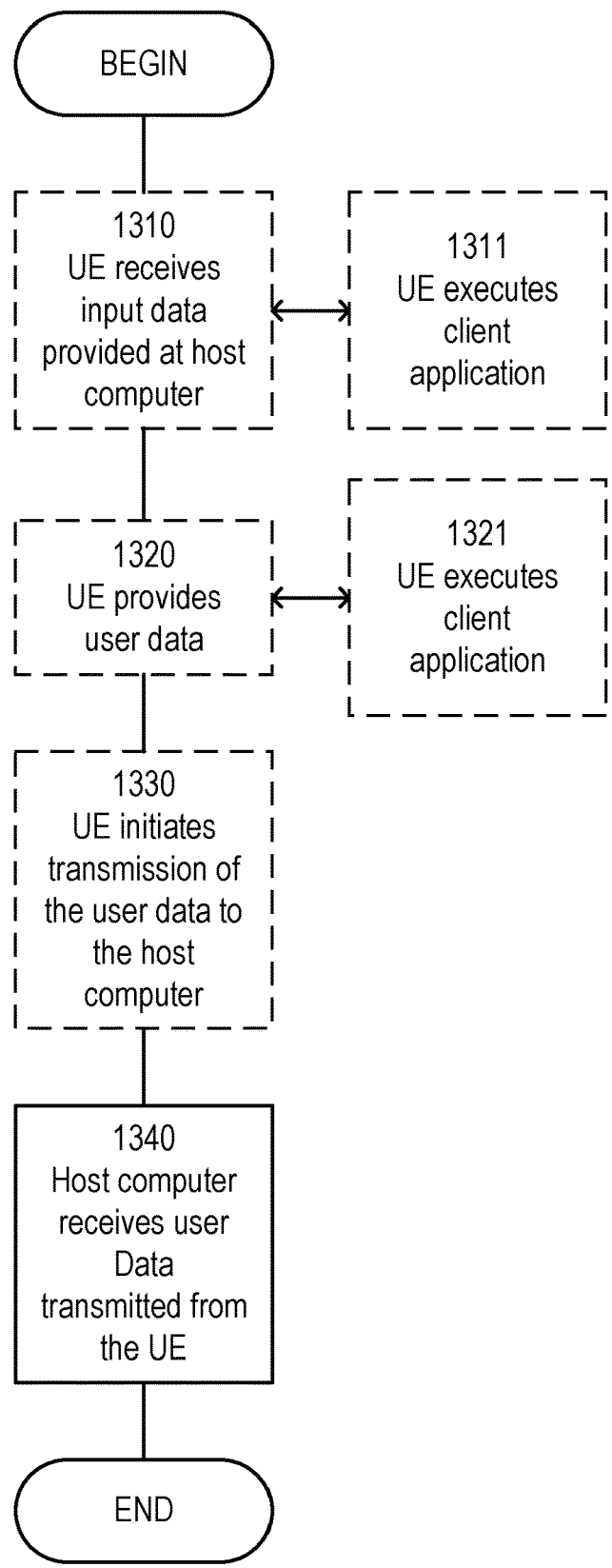

FIG. 13 is a flowchart illustrating a method implemented in a communication system, in accordance with one embodiment. The communication system includes a host computer, a base station, a core network node and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. For example, the UE may initiate a transmission carrying the user data by transmitting the data to the base station, which subsequently transmits the data to the core network node. In step 1340 of the method, the host computer receives the user data transmitted from the UE, in accordance with the teachings of the embodiments described throughout this disclosure.

Figure 14:
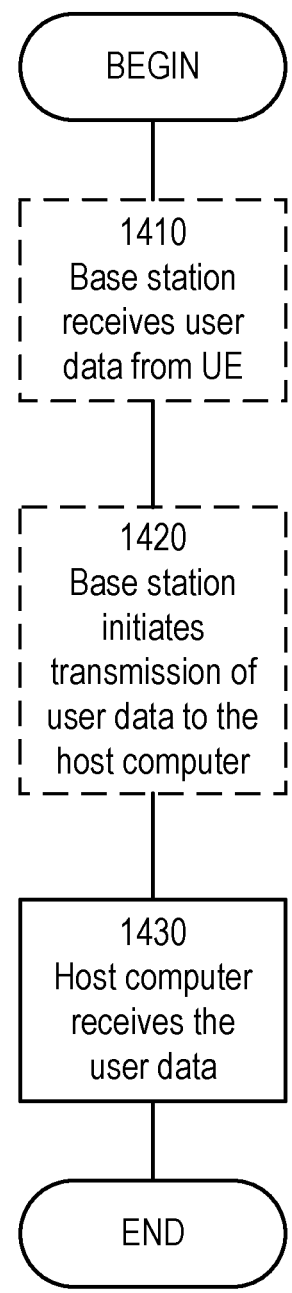

FIG. 14 is a flowchart illustrating a method implemented in a communication system, in accordance with one embodiment. The communication system includes a host computer, a base station, a core network node and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer, via the core network node. In step 1430 (which may be optional), the host computer receives the user data carried in the transmission initiated by the base station.

Figure 15:
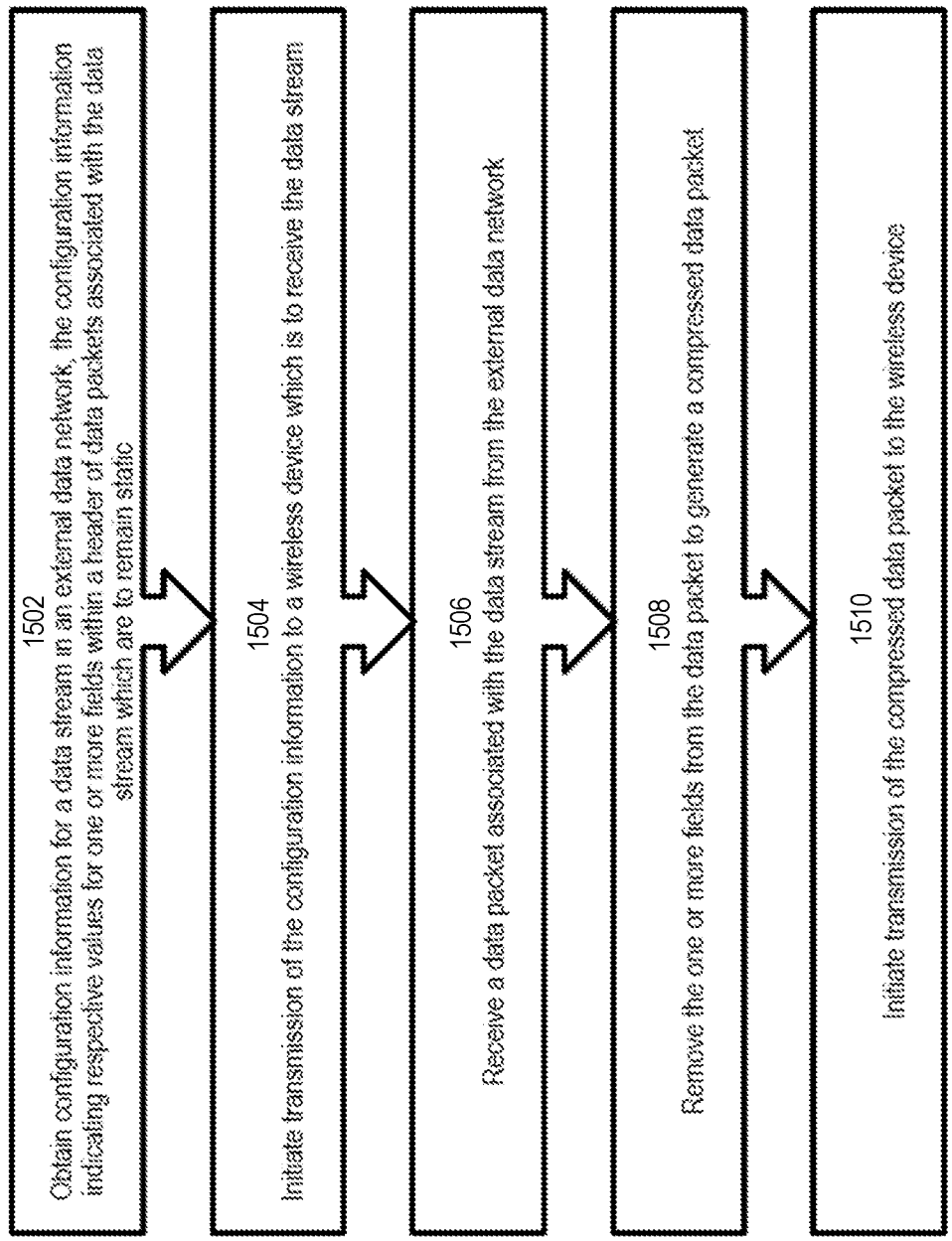
FIG. 15 is a flowchart of a method performed by one or more core network nodes according to embodiments of the disclosure.

FIG. 15 depicts a method in accordance with particular embodiments. The method may be performed by one or more core network nodes. For example, the method may be performed by an AMF and/or a UPF (such as the AMF and UPF described above with respect to FIGS. 1 and 6. Further, the method may relate or correspond to the actions of the element "5G CN" in FIG. 4 described above. The method enables transport of data packets associated with a data stream (such as a TSN or other time-critical data stream) in an external data network (such as an Ethernet network or LAN).

The method begins at step 1502, in which the core network node(s) obtains configuration information for a data stream in an external data network. The configuration information indicates respective values for one or more fields within a header of data packets associated with the data stream which are to remain static. The core network node(s) may receive such configuration information from the external data network directly (e.g., in a request message to establish the data stream), or be pre-configured with the information. The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

In step 1504, the core network node(s) initiates transmission of the configuration information to a wireless device which is to receive the data stream. For example, the configuration information may be transmitted via NAS signalling.

The core network node(s) may establish an identifier for the data stream to enable it to be distinguished from other data streams. In embodiments where data packets are transmitted to the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream.

In step 1506, the core network node(s) receives a data packet associated with the data stream from the external data network. The data packet may be identified as being associated with, or belonging to, the data stream via any suitable mechanism. The identification might be based on MAC addresses and VLAN-headers and/or IP headers. Alternatively or additionally, other aspects (e.g. the Ether-Type field) might also be introduced therein to identify data packets.

In step 1508, the core network node(s) removes the one or more fields from the data packet to generate a compressed data packet. That is, the core network node(s) removes the one or more fields which were identified in the configuration information obtained in step 1502. Optionally, the core network node(s) may add the identifier for the data stream to the compressed data packet. It will be understood that the identifier may be added to the data packet before or after the one or more fields have been removed.

In step 1510, the core network node(s) initiates transmission of the compressed data packet to the wireless device. For example, the core network node(s) may send the compressed data packet to a radio access node (such as a gNB or other base station) for onward transmission to the wireless device.

In further embodiments of the disclosure, the configuration information for the data stream may become updated after the configuration above has been established. In such embodiments, updated configuration information may be obtained for the data stream (e.g., from the external data network), comprising an indication of respective updated values for one or more fields within the header of data packets associated with the data stream which are to remain static. The one or more fields which have static values may be the same as or different to the one or more fields identified originally. The updated configuration information can then be transmitted to the wireless device (e.g., via NAS signalling) to enable the wireless device to decompress data packets which have had header information removed according to the updated configuration. The updated configuration information may comprise a sequence number, indicating the data packet in the sequence of data packets associated with the data stream from which the updated configuration is to apply.

Figure 16:
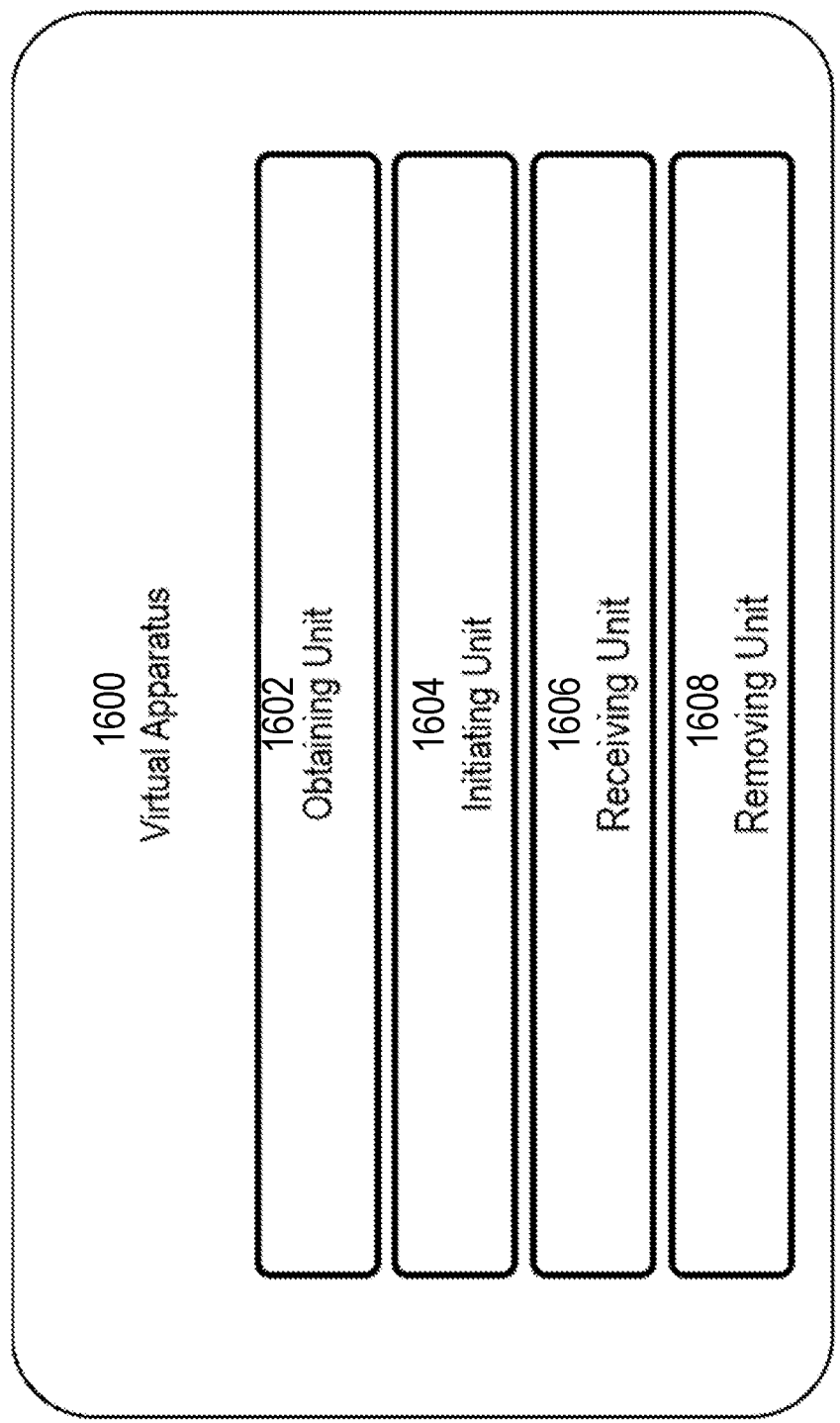
FIG. 16 is a virtualization apparatus according to embodiments of the disclosure.

FIG. 16 illustrates a schematic block diagram of an apparatus 1600 in a wireless network (for example, the wireless network shown in FIG. 6). The apparatus may be implemented in a core network node or a combination of core network nodes (e.g., an AMF and/or UPF as described above with respect to FIGS. 1 and 6). Apparatus 1600 is operable to carry out the example method described with reference to FIG. 15 and possibly any other processes or methods disclosed herein. It is also to be understood that the method of FIG. 15 is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1602, initiating unit 1604, receiving unit 1606 and removing unit 1608, and any other suitable units of apparatus 1600 to perform corresponding functions according one or more embodiments of the present disclosure.

As illustrated in FIG. 16, apparatus 1600 includes obtaining unit 1602, initiating unit 1604, receiving unit 1606 and removing unit 1608. Obtaining unit 1602 is configured to obtain configuration information for a data stream in an external data network. The configuration information indicates respective values for one or more fields within a header of data packets associated with the data stream which are to remain static. Initiating unit 1604 is configured to initiate transmission of the configuration information to a wireless device which is to receive the data stream. Receiving unit 1606 is configured to receive a data packet associated with the data stream from the external data network. Removing unit 1608 is configured to remove the one or more fields from the data packet to generate a compressed data packet. Initiating unit 1604 is further configured to initiate transmission of the compressed data packet to the wireless device.

Figure 17:
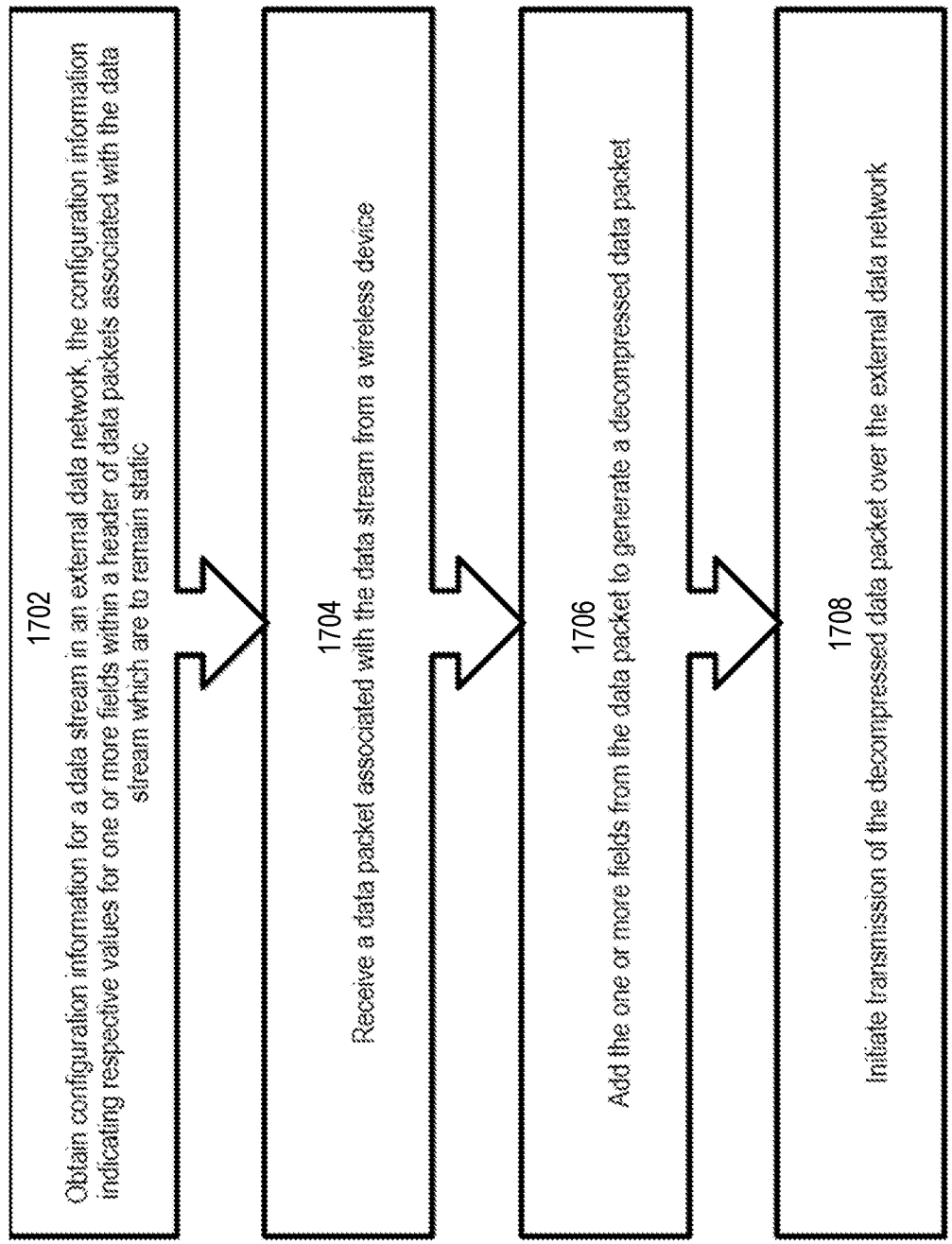
FIG. 17 is a flowchart of a method performed by one or more core network nodes according to further embodiments of the disclosure.

FIG. 17 depicts a method in accordance with particular embodiments. The method may be performed by one or more core network nodes. For example, the method may be performed by an AMF and/or a UPF (such as the AMF and UPF described above with respect to FIGS. 1 and 6. Further, the method may relate or correspond to the actions of the element "5G CN" in FIG. 5 described above. The method enables transport of data packets associated with a data stream (such as a TSN or other time-critical data stream) in an external data network (such as an Ethernet network or LAN).

The method begins at step 1702, in which the core network node(s) obtains configuration information for a data stream in an external data network. The configuration information indicates respective values for one or more fields within a header of data packets associated with the data stream which are to remain static. The core network node(s) may receive such configuration information from the external data network directly (e.g., in a request message to establish the data stream), from a wireless device which is to transmit data packets associated with or belonging to the data stream (e.g., in a request message from the external data network forwarded by the wireless device over signalling such as NAS signalling) or be pre-configured with the information. The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

An identifier for the data stream may be established to enable it to be distinguished from other data streams. In embodiments where data packets are transmitted by the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream. Alternatively, where the core network node(s) establish the identifier for the data stream, the identifier may be transmitted by the core network node(s) to the wireless device.

Optionally, the method may further comprise a step (not illustrated) of sending the configuration information to the wireless device which is to transmit data packets associated with or belonging to the data stream. This step may particularly apply when the configuration information in step 1702 is not received from the wireless device, or when the wireless device is unable to process and obtain the configuration information itself (e.g., from a request message received from the external data network). The configuration information may be sent via NAS signalling, for example.

In step 1704, the core network node(s) receives a data packet associated with the data stream from the wireless device. The data packet is compressed by the removal of one or more fields in the header (e.g., by the wireless device following the method set out below in FIG. 21), according to the configuration information obtained in step 1702.

In step 1706, the core network node(s) adds the one or more fields from the data packet to generate a decompressed data packet. That is, the core network node(s) adds the one or more fields which were identified in the configuration information obtained in step 1702.

In step 1708, the core network node(s) initiates transmission of the decompressed data packet over the external data network.

In further embodiments of the disclosure, the configuration information for the data stream may become updated after the configuration above has been established. In such embodiments, updated configuration information may be obtained for the data stream (e.g., from the external data network or the wireless device), comprising an indication of respective updated values for one or more fields within the header of data packets associated with the data stream which are to remain static. The one or more fields which have static values may be the same as or different to the one or more fields identified originally. The updated configuration information transmitted to the wireless device (e.g., via NAS signalling), particularly if the updated configuration information is received from the external data network directly. Additionally or alternatively, the updated configuration information is utilized to decompress received data packets in future which have been compressed by the wireless device according to the updated configuration. The updated configuration information may comprise a sequence number, indicating the data packet in the sequence of data packets associated with the data stream from which the updated configuration is to apply. Thus the core network node(s) may add header fields according to the updated configuration for all data packets which follow the sequence number indicated in the updated configuration information. Optionally, the core network node(s) may re-order received data packets according to their respective sequence numbers to facilitate this processing.

Figure 18:
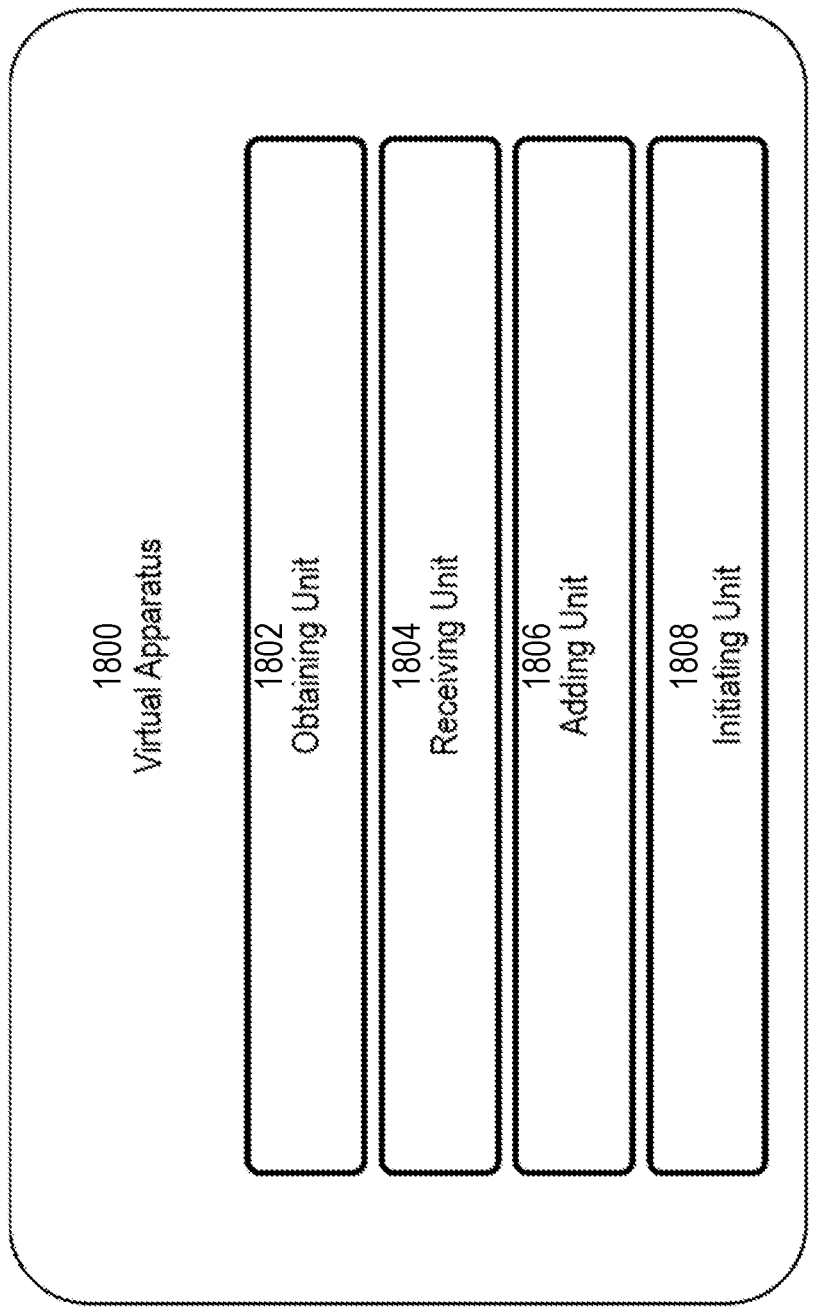
FIG. 18 is a virtualization apparatus according to further embodiments of the disclosure.

FIG. 18 illustrates a schematic block diagram of an apparatus 1800 in a wireless network (for example, the wireless network shown in FIG. 6). The apparatus may be implemented in a wireless device or network node (e.g., wireless device 610 or network node 660 shown in FIG. 6). Apparatus 1800 is operable to carry out the example method described with reference to FIG. 17 and possibly any other processes or methods disclosed herein. It is also to be understood that the method of FIG. 17 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1802, receiving unit 1804, adding unit 1806 and initiating unit 1808, and any other suitable units of apparatus 1800 to perform corresponding functions according one or more embodiments of the present disclosure.

As illustrated in FIG. 18, apparatus 1800 includes obtaining unit 1802, receiving unit 1804, adding unit 1806 and initiating unit 1808. Obtaining unit 1802 is configured to obtain configuration information for a data stream in an external data network. The configuration information indicates respective values for one or more fields within a header of data packets associated with the data stream which are to remain static. Receiving unit 1804 is configured to receive a data packet associated with the data stream from a wireless device. Adding unit 1806 is configured to add the one or more fields to the data packet to generate a decompressed data packet. Initiating unit 1808 is configured to initiate transmission of the decompressed data packet over the external data network.

Figure 19:
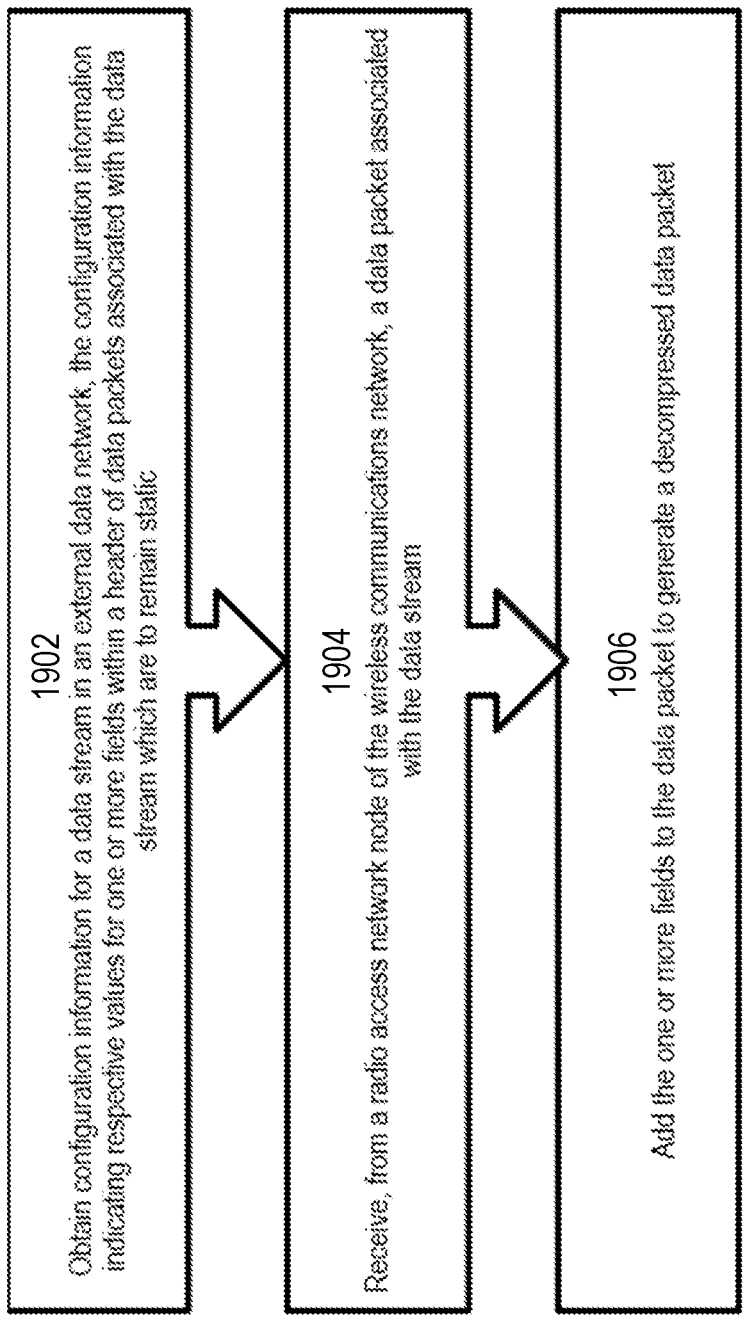
FIG. 19 is a flowchart of a method performed by a wireless device according to embodiments of the disclosure.

FIG. 19 depicts a method in accordance with particular embodiments. The method may be performed by a wireless device (such as the UE described above with respect to FIG. 1, the wireless device 610 described above with respect to FIG. 6 and/or the UE 700 described above with respect to FIG. 7). Further, the method may relate or correspond to the actions of the element "UE" in FIG. 4 described above. The method enables transport of data packets associated with a data stream (such as a TSN or other time-critical data stream) in an external data network (such as an Ethernet network or LAN).

The method begins at step 1902, in which the wireless device obtains configuration information for a data stream in an external data network. The configuration information indicates respective values for one or more fields within a header of data packets associated with the data stream which are to remain static. The wireless device may receive such configuration information from the external data network directly (e.g., in a request message to establish the data stream), or from one or more core network nodes (e.g., via a transmission from a radio access network node, such as a gNB or other base station, via NAS signalling). The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

An identifier for the data stream may be established to enable it to be distinguished from other data streams. In embodiments where data packets are received by the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream.

In step 1904, the wireless device receives a data packet associated with the data stream from the radio access network node. The data packet is compressed by the removal of one or more fields in the header (e.g., by the core network node(s) or the radio access network node itself following the method set out above in FIG. 15), according to the configuration information obtained in step 1902.

In step 1906, the wireless device adds the one or more fields from the data packet to generate a decompressed data packet. That is, the wireless device adds the one or more fields which were identified in the configuration information obtained in step 1902. Optionally, the decompressed data packet may be transmitted onwards over the external data network.

In further embodiments of the disclosure, the configuration information for the data stream may become updated after the configuration above has been established. In such embodiments, updated configuration information may be obtained for the data stream (e.g., from the core network node), comprising an indication of respective updated values for one or more fields within the header of data packets associated with the data stream which are to remain static. The one or more fields which have static values may be the same as or different to the one or more fields identified originally. The updated configuration information is then utilized to decompress received data packets in future which have been compressed by the core network node(s) or radio access network node according to the updated configuration. The updated configuration information may comprise a sequence number, indicating the data packet in the sequence of data packets associated with the data stream from which the updated configuration is to apply. Thus the wireless device may add header fields according to the updated configuration for all data packets which follow the sequence number indicated in the updated configuration information. Optionally, the wireless device may re-order received data packets according to their respective sequence numbers to facilitate this processing.

Figure 20:
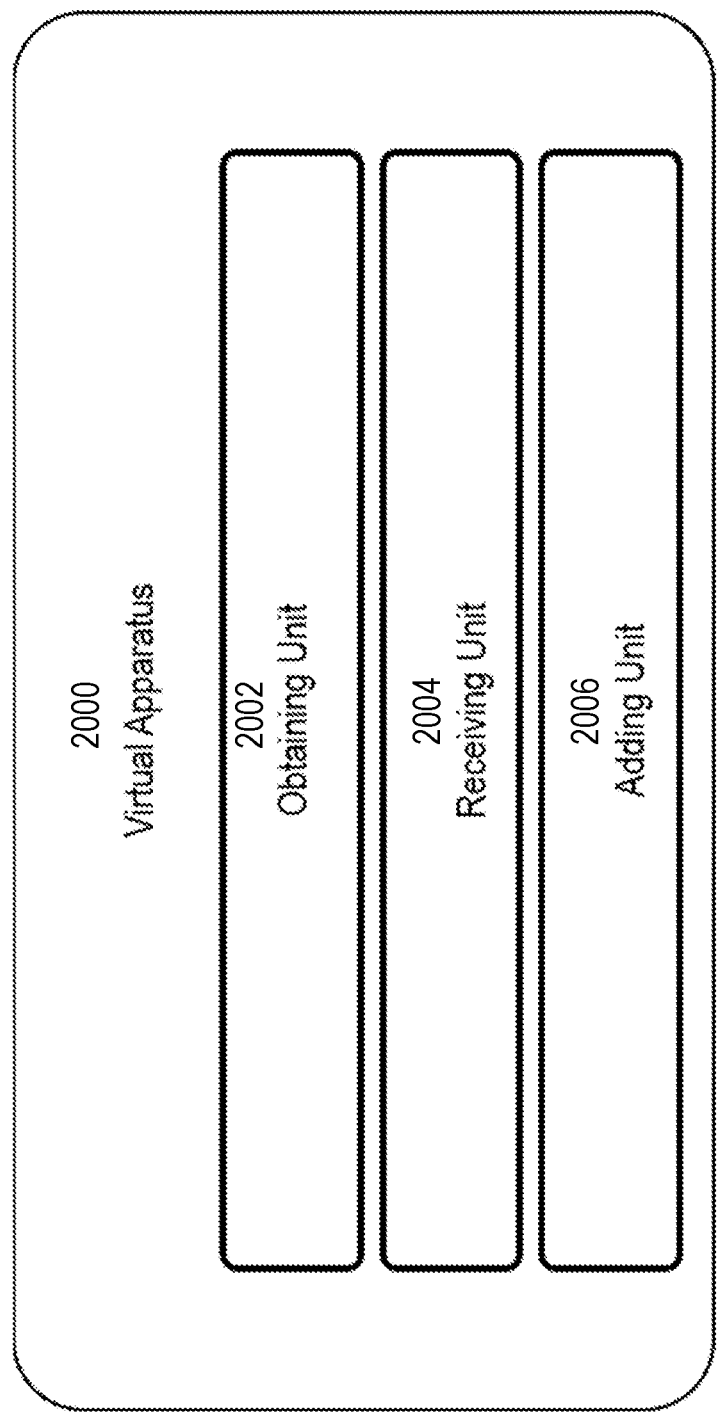
FIG. 20 is a virtualization apparatus according to further embodiments of the disclosure.

FIG. 20 illustrates a schematic block diagram of an apparatus 2000 in a wireless network (for example, the wireless network shown in FIG. 6). The apparatus may be implemented in a wireless device or UE (such as the UE described above with respect to FIG. 1, the wireless device 610 described above with respect to FIG. 6 and/or the UE 700 described above with respect to FIG. 7). Apparatus 2000 is operable to carry out the example method described with reference to FIG. 19 and possibly any other processes or methods disclosed herein. It is also to be understood that the method of FIG. 19 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 2002, receiving unit 2004, and adding unit 2006, and any other suitable units of apparatus 2000 to perform corresponding functions according one or more embodiments of the present disclosure.

As illustrated in FIG. 20, apparatus 2000 includes obtaining unit 2002, receiving unit 2004, and adding unit 2006. Obtaining unit 2002 is configured to obtain configuration information for a data stream in an external data network, the configuration information indicating respective values for one or more fields within a header of data packets associated with the data stream which are to remain static. Receiving unit 2004 is configured to receive, from a radio access network node of the wireless communications network, a data packet associated with the data stream. Adding unit 2006 is configured to add the one or more fields to the data packet to generate a decompressed data packet.

Figure 21:
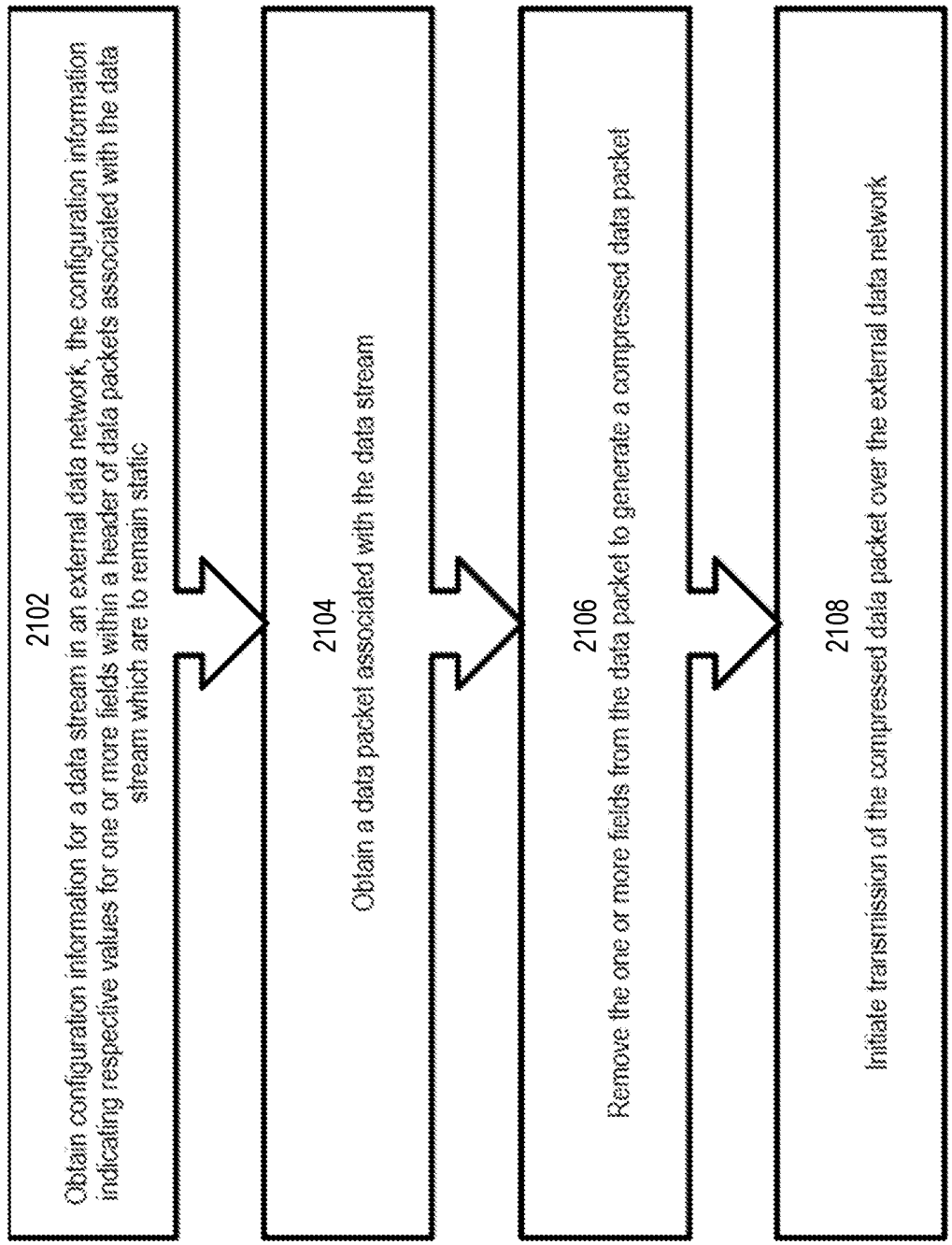
FIG. 21 is a flowchart of a method performed by a wireless device according to further embodiments of the disclosure.

FIG. 21 depicts a method in accordance with particular embodiments. The method may be performed by a wireless device (such as the UE described above with respect to FIG. 1, the wireless device 610 described above with respect to FIG. 6 and/or the UE 700 described above with respect to FIG. 7). Further, the method may relate or correspond to the actions of the element "UE" in FIG. 5 described above. The method enables transport of data packets associated with a data stream (such as a TSN or other time-critical data stream) in an external data network (such as an Ethernet network or LAN).

The method begins at step 2102, in which the wireless device obtains configuration information for a data stream in an external data network. The configuration information indicates respective values for one or more fields within a header of data packets associated with the data stream which are to remain static. The wireless device may receive such configuration information from the external data network directly (e.g., in a request message to establish the data stream), or from one or more core network nodes (e.g., via NAS or RRC signalling). The one or more fields for which values may be static may comprise one or more Ethernet header fields, such as one or more (or all) of: destination address field; source address field; virtual LAN tag field; and type/length field. The one or more fields may additionally or alternatively comprise one or more fields in the IP header.

An identifier for the data stream may be established (e.g., by the one or more core network nodes) to enable it to be distinguished from other data streams. In embodiments where data packets are received by the wireless device as part of a PDU session or QoS flow, the identifier may be unique within the PDU session or QoS flow (and therefore in such embodiments an identifier value may be re-used for different data flows outside the PDU session or QoS flow). The configuration information may additionally include the identifier for the associated data stream.

In step 2104, the wireless device obtains a data packet associated with or belonging to the data stream. For example, the data packet may be received from the external data network, or generated by the wireless device (e.g., in response to some user interaction or by execution of an application on the wireless device).

In step 2106, the wireless device removes the one or more fields from the data packet to generate a compressed data packet. That is, the wireless device removes the one or more fields which were identified in the configuration information obtained in step 2102. Optionally, the wireless device may add the identifier for the data stream to the compressed data packet. It will be understood that the identifier may be added to the data packet before or after the one or more fields have been removed. The header removal function may be implemented in an SDAP or PDCP transmission algorithm.

In step 2108, the wireless device initiates transmission of the compressed data packet over the external data network. For example, the wireless device may send the compressed data packet in a transmission to a radio access network node (such as a gNB or other base station) for onward transmission to one or more core network nodes and thereafter the external data network. The one or more core network nodes are enabled to decompress the compressed data packets prior to their transmission over the external data network, e.g., by following the methods set out above in FIGS. 5 and 17).

In further embodiments of the disclosure, the configuration information for the data stream may become updated after the configuration above has been established. In such embodiments, updated configuration information may be obtained for the data stream (e.g., from the external data network), comprising an indication of respective updated values for one or more fields within the header of data packets associated with the data stream which are to remain static. The one or more fields which have static values may be the same as or different to the one or more fields identified originally. The updated configuration information can then be transmitted by the wireless device (e.g., via NAS signalling) to one or more core network nodes to enable those core network nodes to decompress data packets which have had header information removed according to the updated configuration. The updated configuration information may comprise a sequence number, indicating the data packet in the sequence of data packets associated with the data stream from which the updated configuration is to apply.

Figure 22:
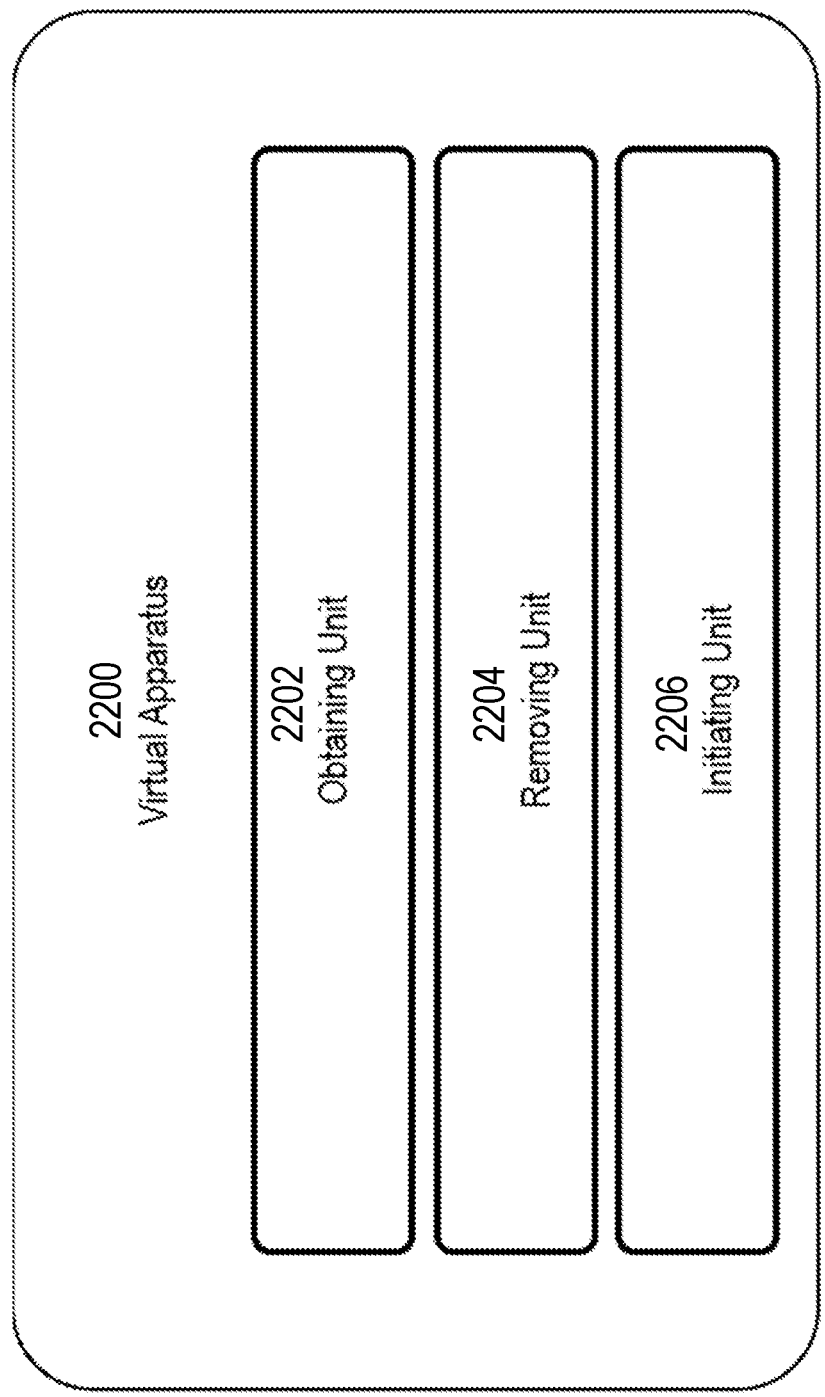
FIG. 22 is a virtualization apparatus according to further embodiments of the disclosure.

FIG. 22 illustrates a schematic block diagram of an apparatus 2200 in a wireless network (for example, the wireless network shown in FIG. 6). The apparatus may be implemented in a wireless device or UE (such as the UE described above with respect to FIG. 1, the wireless device 610 described above with respect to FIG. 6 and/or the UE 700 described above with respect to FIG. 7). Apparatus 2200 is operable to carry out the example method described with reference to FIG. 17 and possibly any other processes or methods disclosed herein. It is also to be understood that the method of FIG. 17 is not necessarily carried out solely by apparatus 2200. At least some operations of the method can be performed by one or more other entities.

Virtual Apparatus 2200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 2202, removing unit 2204, and initiating unit 2206, and any other suitable units of apparatus 2200 to perform corresponding functions according one or more embodiments of the present disclosure.

As illustrated in FIG. 22, apparatus 2200 includes obtaining unit 2202, removing unit 2204, and initiating unit 2206. Obtaining unit 2202 is configured to obtain configuration information for a data stream in an external data network. The configuration information indicates respective values for one or more fields within a header of data packets associated with the data stream which are to remain static. Obtaining unit 2202 is further configured to obtain a data packet associated with the data stream. Removing unit 2204 is configured to remove the one or more fields from the data packet to generate a compressed data packet. Initiating unit 2206 is configured to initiate transmission of the compressed data packet over the external data network via a transmission to a radio access network node of a wireless communications network.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. For the avoidance of doubt, the following numbered statements set out embodiments of the disclosure:

Group Z Embodiments

1. A method performed by a core network node for a wireless communications network for transport of data packets associated with a data stream in an external data network, the method comprising:
   obtaining configuration information for a data stream in an external data network, the configuration information indicating respective values for one or more fields within a header of data packets associated with the data stream which are to remain static;
   initiating transmission of the configuration information to a wireless device which is to receive the data stream;
   receiving a data packet associated with the data stream from the external data network;
   removing the one or more fields from the data packet to generate a compressed data packet; and
   initiating transmission of the compressed data packet to the wireless device.

2. The method according to embodiment 1, wherein the step of obtaining configuration information comprises receiving the configuration information from the external data network.
3. The method according to embodiment 1, wherein the configuration information is pre-configured in the core network node.
4. The method according to any preceding embodiment, wherein the compressed data packet comprises an identifier for the data stream.
5. The method according to embodiment 4, wherein the identifier is added by the core network node.
6. The method according to any preceding embodiment, wherein the compressed data packet is transmitted to the wireless device as part of a protocol data unit (PDU) session or a quality of service (QoS) flow.
7. The method according to embodiment 6, when dependent on embodiment 4 or 5, wherein the identifier for the data stream is unique within the PDU session or QoS flow.
8. The method according to any preceding embodiment, wherein the configuration information is transmitted to the wireless device using non-access stratum (NAS) signaling.
9. The method according to any preceding embodiment, wherein the configuration information comprises an identifier for the data stream.
10. The method according to any preceding embodiment, further comprising:
    obtaining updated configuration information for the data stream, the updated configuration information comprising an indication of respective updated values for one or more fields within the header of data packets associated with the data stream which are to remain static; and
    initiating transmission of the updated configuration information to the wireless device.
11. The method according to embodiment 10, wherein the updated configuration information further comprises an indication of a sequence number identifying a data packet associated with the data stream from which the respective updated values apply.
12. The method of any of the previous embodiments, wherein the data packet comprises user data, and wherein the step of initiating transmission of the compressed data packet to the wireless device comprises forwarding the user data to the wireless device via a transmission to a base station.
13. A method performed by a core network node for a wireless communications network for transport of data packets associated with a data stream in an external data network, the method comprising:
    obtaining configuration information for a data stream in an external data network, the configuration information indicating respective values for one or more fields within a header of data packets associated with the data stream which are to remain static;
    receiving a data packet associated with the data stream from a wireless device;
    adding the one or more fields to the data packet to generate a decompressed data packet; and
    initiating transmission of the decompressed data packet over the external data network.
14. The method according to embodiment 13, wherein the step of obtaining configuration information comprises receiving the configuration information from the wireless device.
15. The method according to embodiment 13 or 14, further comprising initiating transmission, to the wireless device, of an indication of the respective values for one or more fields within the header of data packets associated with the data stream which are to remain static.
16. The method according to any one of embodiments 13 to 15, wherein the data packet comprises an identifier for the data stream.
17. The method according to any one of embodiments 13 to 16, wherein the compressed data packet is transmitted by the wireless device as part of a protocol data unit (PDU) session or a quality of service (QoS) flow.
18. The method according to embodiment 17, when dependent on embodiment 16, wherein the identifier for the data stream is unique within the PDU session or QoS flow.
19. The method according to any one of embodiments 13 to 18, wherein the configuration information comprises an identifier for the data stream.
20. The method according to any one of embodiments 13 to 19, further comprising:
    obtaining updated configuration information for the data stream, the updated configuration information comprising an indication of respective updated values for one or more fields within the header of data packets associated with the data stream which are to remain static; and
    initiating transmission of the updated configuration information to the wireless device.
21. The method according to embodiment 20, wherein the updated configuration information further comprises an indication of a sequence number identifying a data packet associated with the data stream from which the respective updated values apply.
22. The method of any of embodiments 13 to 21, wherein the data packet comprises user data, and wherein the step of initiating transmission of the decompressed data packet over the external data network comprises forwarding the user data to a host computer over the external data network.
23. The method of any preceding embodiment, wherein the core network node is one of an access management function and a user plane function.
24. The method of any preceding embodiment, wherein the data stream is a time-sensitive networking data stream.
25. The method of any preceding embodiment, wherein the external data network is an Ethernet network.
26. The method of any preceding embodiment, wherein the wireless communications network is a cellular communications network, such as a New Radio wireless communications network.

Group A Embodiments

27. A method performed by a wireless device associated with a wireless communications network, for transport of data packets associated with a data stream in an external data network, the method comprising:
    obtaining configuration information for a data stream in an external data network, the configuration information indicating respective values for one or more fields within a header of data packets associated with the data stream which are to remain static;

receiving, from a radio access network node of the wireless communications network, a data packet associated with the data stream; and adding the one or more fields to the data packet to generate a decompressed data packet.

28. The method according to embodiment 27, wherein the step of obtaining configuration information comprises receiving the configuration information from a core network node of the wireless communications network.

29. The method according to embodiment 27 or 28, wherein the data packet comprises an identifier for the data stream.

30. The method according to embodiment 29, as dependent on embodiment 28, wherein the identifier is added by the core network node.

31. The method according to any of embodiments 27 to 30, wherein the compressed data packet is received as part of a protocol data unit (PDU) session or a quality of service (QoS) flow.

32. The method according to embodiment 31, when dependent on embodiment 29 or 30, wherein the identifier for the data stream is unique within the PDU session or QoS flow.

33. The method according to any of embodiments 27 to 32, wherein the configuration information is transmitted to the wireless device using non-access stratum (NAS) signaling.

34. The method according to any of embodiments 27 to 33, wherein the configuration information comprises an identifier for the data stream.

35. The method according to any of embodiments 27 to 34, further comprising:

obtaining updated configuration information for the data stream, the updated configuration information comprising an indication of respective updated values for one or more fields within the header of data packets associated with the data stream which are to remain static; and utilizing the updated configuration information to add the respective updated values for one or more fields to data packets received from the radio access network node.

36. The method according to embodiment 35, wherein the updated configuration information further comprises an indication of a sequence number identifying a data packet associated with the data stream from which the respective updated values apply.

37. The method of any of embodiments 27 to 36, wherein the data packet comprises user data.

38. The method of any of embodiments 27 to 37, wherein the radio access network node comprises a base station.

39. A method performed by a wireless device for transport of data packets associated with a data stream in an external data network, the method comprising:

obtaining configuration information for a data stream in an external data network, the configuration information indicating respective values for one or more fields within a header of data packets associated with the data stream which are to remain static;

obtaining a data packet associated with the data stream;

removing the one or more fields from the data packet to generate a compressed data packet; and initiating transmission of the compressed data packet over the external data network via a transmission to a radio access network node of a wireless communications network.

40. The method according to embodiment 39, wherein the step of obtaining configuration information comprises receiving the configuration information from a core network node of the wireless communications network.

41. The method according to embodiment 39, wherein the step of obtaining configuration information comprises receiving the configuration information from the external data network.

42. The method according to embodiment 41, further comprising initiating transmission, to a core network node of the wireless communications network, of an indication of the respective values for one or more fields within the header of data packets associated with the data stream which are to remain static, to enable the core network node to decompress the compressed data packet prior to its transmission over the external data network.

43. The method according to any one of embodiments 39 to 42, wherein the data packet comprises an identifier for the data stream.

44. The method according to any one of embodiments 39 to 43, wherein the compressed data packet is transmitted by the wireless device as part of a protocol data unit (PDU) session or a quality of service (QoS) flow.

45. The method according to embodiment 44, when dependent on embodiment 43, wherein the identifier for the data stream is unique within the PDU session or QoS flow.

46. The method according to any one of embodiments 39 to 45, wherein the configuration information comprises an identifier for the data stream.

47. The method of any of embodiments 13 to 21, wherein the data packet comprises user data, and wherein the step of initiating transmission of the compressed data packet over the external data network comprises forwarding the user data to a host computer over the external data network.

48. The method of any of embodiments 27 to 47, wherein the data stream is a time-sensitive networking data stream.

49. The method of any preceding of embodiments 27 to 48, wherein the external data network is an Ethernet network.

50. The method of any of embodiments 27 to 49, wherein the wireless communications network is a cellular communications network, such as a New Radio wireless communications network.

Group C Embodiments

51. A wireless device, the wireless device comprising:
processing circuitry configured to perform any of the steps of any of the Group A embodiments; and
power supply circuitry configured to supply power to the wireless device.

52. A core network node, comprising:
processing circuitry configured to perform any of the steps of any of the Group Z embodiments;
power supply circuitry configured to supply power to the core network node.

53. A user equipment (UE), the UE comprising:
an antenna configured to send and receive wireless signals;
radio front-end circuitry connected to the antenna and to processing circuitry, and configured to condition signals communicated between the antenna and the processing circuitry;

the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

54. A communication system including a host computer comprising:
processing circuitry configured to provide user data; and
a communication interface configured to forward the user data to a cellular network for transmission to a user equipment (UE),
wherein the cellular network comprises a core network node having a communications interface and processing circuitry, the core network node's processing circuitry configured to perform any of the steps of any of the Group Z embodiments.

55. The communication system of the previous embodiment further including the core network node.

56. The communication system of the previous 2 embodiments, further including the UE, wherein the UE is configured to communicate with the core network node via a base station.

57. The communication system of the previous 3 embodiments, wherein:
the processing circuitry of the host computer is configured to execute a host application, thereby providing the user data; and
the UE comprises processing circuitry configured to execute a client application associated with the host application.

58. A method implemented in a communication system including a host computer, a core network node and a user equipment (UE), the method comprising:
at the host computer, providing user data; and
at the host computer, initiating a transmission carrying the user data to the UE via a cellular network comprising the core network node, wherein the core network node performs any of the steps of any of the Group Z embodiments.

59. The method of the previous embodiment, wherein the communication system further comprises a base station, the method further comprising, at the base station, transmitting the user data.

60. The method of the previous 2 embodiments, wherein the user data is provided at the host computer by executing a host application, the method further comprising, at the UE, executing a client application associated with the host application.

61. A user equipment (UE) configured to communicate with a base station, the UE comprising a radio interface and processing circuitry configured to perform any of the previous 3 embodiments.

62. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

63. The communication system of the previous embodiment, wherein the cellular network further includes a base station configured to communicate with the UE.

64. The communication system of the previous 2 embodiments, wherein:
the processing circuitry of the host computer is configured to execute a host application, thereby providing the user data; and
the UE's processing circuitry is configured to execute a client application associated with the host application.

65. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

66. The method of the previous embodiment, further comprising at the UE, receiving the user data from the base station.

67. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

68. The communication system of the previous embodiment, further including the UE.

69. The communication system of the previous 2 embodiments, further including the base station, wherein the base station comprises a radio interface configured to communicate with the UE and a communication interface configured to forward to the host computer the user data carried by a transmission from the UE to the base station.

70. The communication system of the previous 3 embodiments, wherein:
the processing circuitry of the host computer is configured to execute a host application; and
the UE's processing circuitry is configured to execute a client application associated with the host application, thereby providing the user data.

71. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

72. A method implemented in a communication system including a host computer, a base station and a user equipment (UE), the method comprising:

at the host computer, receiving user data transmitted to the base station from the UE, wherein the UE performs any of the steps of any of the Group A embodiments.

73. The method of the previous embodiment, further comprising, at the UE, providing the user data to the base station.

74. The method of the previous 2 embodiments, further comprising:
    at the UE, executing a client application, thereby providing the user data to be transmitted; and
    at the host computer, executing a host application associated with the client application.

75. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to 76. A communication system including a host computer comprising a communication interface configured to receive user data originating from a transmission from a user equipment (UE) to a core network node via a base station, wherein the core network node comprises a communication interface and processing circuitry, the core network node's processing circuitry configured to perform any of the steps of any of the Group Z embodiments.

77. The communication system of the previous embodiment further including the base station.

78. The communication system of the previous 2 embodiments, further including the UE, wherein the UE is configured to communicate with the base station.

79. The communication system of the previous 3 embodiments, wherein:
    the processing circuitry of the host computer is configured to execute a host application;
    the UE is configured to execute a client application associated with the host application, thereby providing the user data to be received by the host computer.

80. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.

81. The method of the previous embodiment, further comprising at the base station, receiving the user data from the UE.

82. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
1xRTT CDMA2000 1x Radio Transmission Technology
3GPP 3rd Generation Partnership Project
5G 5th Generation
5GS 5G System
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LAN Local-Area Network
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
URLLC Ultra-Reliable Low-Latency Communications
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a core network node for a wireless communications network for transport of data packets associated with a data stream in an external Ethernet data network, the method comprising:
obtaining configuration information for the data stream in the external Ethernet data network, the configuration information indicating respective values for one or more fields within a header of data packets associated with the data stream, wherein the respective values for the one or more fields are to remain static;
initiating transmission of the configuration information to a wireless device which is to receive the data stream;
receiving a data packet associated with the data stream from the external Ethernet data network;
removing the one or more fields from the data packet to generate a compressed data packet; and
initiating transmission of the compressed data packet to the wireless device.

2. The method according to claim 1, wherein the step of obtaining configuration information comprises receiving the configuration information from the external Ethernet data network, or wherein the configuration information is pre-configured in the core network node.

3. The method according to claim 1, wherein the compressed data packet comprises an identifier for the data stream.

4. The method according to claim 3, wherein the compressed data packet is transmitted to the wireless device as part of a protocol data unit (PDU) session or a quality of service (QoS) flow, and wherein the identifier for the data stream is unique within the PDU session or QoS flow.

5. The method according to claim 1, wherein the configuration information comprises an identifier for the data stream.

6. The method according to claim 1, further comprising:
obtaining updated configuration information for the data stream, the updated configuration information comprising an indication of respective updated values for the one or more fields within the header of data packets associated with the data stream; and
initiating transmission of the updated configuration information to the wireless device.

7. A method performed by a core network node for a wireless communications network for transport of data packets associated with a data stream in an external Ethernet data network, the method comprising:
obtaining configuration information for the data stream in the external Ethernet data network, the configuration information indicating respective values for one or more fields within a header of data packets associated with the data stream, wherein the respective values for the one or more fields are to remain static;
receiving a data packet associated with the data stream from a wireless device;
adding the one or more fields to the data packet to generate a decompressed data packet; and
initiating transmission of the decompressed data packet over the external Ethernet data network.

8. The method according to claim 7, wherein the step of obtaining configuration information comprises receiving the configuration information from the wireless device.

9. The method according to claim 7, further comprising initiating transmission, to the wireless device, of an indication of the respective values for the one or more fields.

10. The method according to claim 7, wherein the core network node is one of an access management function and a user plane function.

11. A method performed by a wireless device associated with a wireless communications network, for transport of data packets associated with a data stream in an external Ethernet data network, the method comprising:

obtaining configuration information for the data stream in the external Ethernet data network, the configuration information indicating respective values for one or more fields within a header of data packets associated with the data stream, wherein the respective values for the one or more fields are to remain static;
receiving, from a radio access network node of the wireless communications network, a data packet associated with the data stream; and
adding the one or more fields to the data packet to generate a decompressed data packet.

12. The method according to claim 11, wherein the step of obtaining configuration information comprises receiving the configuration information from a core network node of the wireless communications network.

13. The method according to claim 11, wherein the data packet comprises an identifier for the data stream.

14. The method according to claim 13, wherein the compressed data packet is received as part of a protocol data unit (PDU) session or a quality of service (QoS) flow, and wherein the identifier for the data stream is unique within the PDU session or QoS flow.

15. The method according to claim 11, wherein the configuration information comprises an identifier for the data stream.

16. The method according to claim 11, further comprising:
obtaining updated configuration information for the data stream, the updated configuration information comprising an indication of respective updated values for the one or more fields within the header of data packets associated with the data stream; and
utilizing the updated configuration information to add the respective updated values for one or more fields to data packets received from the radio access network node.

17. The method according to claim 16, wherein the updated configuration information further comprises an indication of a sequence number identifying a data packet associated with the data stream from which the respective updated values apply.

18. A method performed by a wireless device for transport of data packets associated with a data stream in an external Ethernet data network, the method comprising:
obtaining configuration information for the data stream in the external Ethernet data network, the configuration information indicating respective values for one or more fields within a header of data packets associated with the data stream, wherein the respective values for the one or more fields are to remain static;
obtaining a data packet associated with the data stream;
removing the one or more fields from the data packet to generate a compressed data packet; and
initiating transmission of the compressed data packet over the external Ethernet data network via a transmission to a radio access network node of a wireless communications network.

19. The method according to claim 18, wherein the step of obtaining configuration information comprises receiving the configuration information from a core network node of the wireless communications network or receiving the configuration information from the external Ethernet data network.

20. The method according to claim 19, wherein the step of obtaining configuration information comprises receiving the configuration information from the external Ethernet data network, and further comprising initiating transmission, to a core network node of the wireless communications network, of an indication of the respective values for the one or more fields, to enable the core network node to decompress the compressed data packet prior to its transmission over the external Ethernet data network.

21. The method according to claim 18, wherein the data packet comprises an identifier for the data stream.

22. The method according to claim 18, wherein the configuration information comprises an identifier for the data stream.

23. The method according to claim 18, wherein the data stream is a time-sensitive networking data stream.

24. A wireless device, the wireless device comprising:
processing circuitry configured to:
obtain configuration information for a data stream in an external Ethernet data network, the configuration information indicating respective values for one or more fields within a header of data packets associated with the data stream, wherein the respective values for the one or more fields are to remain static;
receive, from a radio access network node of a wireless communications network, a data packet associated with the data stream; and
add the one or more fields to the data packet to generate a decompressed data packet; and
power supply circuitry configured to supply power to the wireless device.

25. The wireless device according to claim 24, wherein the wireless device is configured to obtain configuration information by receiving the configuration information from a core network node of the wireless communications network.

26. The wireless device according to claim 24, wherein the data packet comprises an identifier for the data stream.

27. The wireless device according to claim 26, wherein the compressed data packet is received as part of a protocol data unit (PDU) session or a quality of service (QoS) flow, and wherein the identifier for the data stream is unique within the PDU session or QoS flow.

28. The wireless device according to claim 24, wherein the configuration information comprises an identifier for the data stream.

29. The wireless device according to claim 24, wherein the wireless device is further caused to:
obtain updated configuration information for the data stream, the updated configuration information comprising an indication of respective updated values for the one or more fields; and
utilize the updated configuration information to add the respective updated values for one or more fields to data packets received from the radio access network node.

30. The wireless device according to claim 29, wherein the updated configuration information further comprises an indication of a sequence number identifying a data packet associated with the data stream from which the respective updated values apply.

31. A wireless device the wireless device comprising:
processing circuitry configured to:
obtain configuration information for a data stream in an external Ethernet data network, the configuration information indicating respective values for one or more fields within a header of data packets associated with the data stream, wherein the respective values for the one or more fields are to remain static;
obtain a data packet associated with the data stream;
remove the one or more fields from the data packet to generate a compressed data packet; and initiate transmission of the compressed data packet over the external Ethernet data network via a transmission to a radio access network node of a wireless communications network; and power supply circuitry configured to supply power to the wireless device.

32. The wireless device according to claim 31, wherein the wireless device is configured to obtain configuration information by receiving the configuration information from a core network node of the wireless communications network or receiving the configuration information from the external Ethernet data network.

33. The wireless device according to claim 32, wherein the wireless device is configured to obtain configuration information by receiving the configuration information from the external Ethernet data network, and wherein the wireless device is further caused to initiate transmission, to a core network node of the wireless communications network, of an indication of the respective values for the one or more fields, to enable the core network node to decompress the compressed data packet prior to its transmission over the external Ethernet data network.

34. The wireless device according to claim 31, wherein the data packet comprises an identifier for the data stream.

35. The wireless device according to claim 31, wherein the configuration information comprises an identifier for the data stream.

36. A core network node, comprising:
processing circuitry configured to:
obtain configuration information for a data stream in an external Ethernet data network, the configuration information indicating respective values for one or more fields within a header of data packets associated with the data stream, wherein the respective values for the one or more fields are to remain static;
initiate transmission of the configuration information to a wireless device which is to receive the data stream;
receive a data packet associated with the data stream from the external Ethernet data network;
remove the one or more fields from the data packet to generate a compressed data packet; and
initiate transmission of the compressed data packet to the wireless device; and power supply circuitry configured to supply power to the core network node.

37. A core network node, comprising:
processing circuitry configured to:
obtain configuration information for a data stream in an external Ethernet data network, the configuration information indicating respective values for one or more fields within a header of data packets associated with the data stream, wherein the respective values for the one or more fields are to remain static;
receive a data packet associated with the data stream from a wireless device;
add the one or more fields to the data packet to generate a decompressed data packet; and
initiate transmission of the decompressed data packet over the external Ethernet data network; and power supply circuitry configured to supply power to the core network node.

* * * * *